US012613785B2

(12) United States Patent (10) Patent No.: US 12,613,785 B2
Smerdon et al. (45) Date of Patent: Apr. 28, 2026

(54) SYSTEM WEAR LEVELING

(71) Applicant: Hewlett Packard Enterprise Development LP, Spring, TX (US)

(72) Inventors: Gary Smerdon, Los Gatos, CA (US); Isaac R. Nassi, Los Gatos, CA (US); David P. Reed, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/329,627

(22) PCT Filed: Feb. 28, 2023

(86) PCT No.: PCT/US2023/014025
§ 371 (c)(1),
(2) Date: Jun. 6, 2023

(87) PCT Pub. No.: WO2023/229691
PCT Pub. Date: Nov. 30, 2023

(65) Prior Publication Data
US 2025/0086076 A1 Mar. 13, 2025

Related U.S. Application Data

(60) Provisional application No. 63/345,691, filed on May 25, 2022.

(51) Int. Cl.
*G06F 11/20* (2006.01)

(52) U.S. Cl.
CPC ...... *G06F 11/2041* (2013.01); *G06F 2201/81* (2013.01)

(58) Field of Classification Search
CPC .......................... G06F 11/2041; G06F 2201/81
See application file for complete search history.

(56) References Cited

U.S. PATENT DOCUMENTS

| | | | |
|---|---|---|---|
| 10,082,965 B1 * | 9/2018 | Tamilarasan | G06F 12/00 |
| 11,119,872 B1 * | 9/2021 | Jacobson | G06F 11/202 |
| 11,252,068 B1 * | 2/2022 | Kamen | H04N 21/8547 |
| 2014/0068153 A1 | 3/2014 | Gu et al. | |
| 2017/0199681 A1 | 7/2017 | Jain et al. | |
| 2017/0286176 A1 | 10/2017 | Artman et al. | |
| 2020/0177451 A1 | 6/2020 | Easterling et al. | |
| 2021/0216398 A1 | 7/2021 | Davis et al. | |
| 2022/0276905 A1 * | 9/2022 | Manousakis | G06F 11/3006 |
| 2022/0398175 A1 * | 12/2022 | Ukawa | G06F 11/2033 |
| 2023/0267040 A1 * | 8/2023 | Davis | G06F 16/182 |
| | | | 714/704 |

OTHER PUBLICATIONS

International Search Report and Written Opinion received for PCT Patent Application No. PCT/US2023/014025, mailed on Jun. 19, 2023, 10 pages.

* cited by examiner

*Primary Examiner* — Philip Guyton
*Assistant Examiner* — Sean Kevin Mcnamara
(74) *Attorney, Agent, or Firm* — Trop, Pruner & Hu, P.C.

(57) ABSTRACT
A technique includes receiving information relating to wear of computer nodes. Based on the information relating to the wear, the technique includes ranking the computer nodes according to respective expected remaining lifetimes of the computer nodes. The technique includes, responsive to an event that corresponds to at least one of a spare computer node being added to the system or a given computer node being removed from the system, reconfiguring the system based on the ranking.

20 Claims, 9 Drawing Sheets

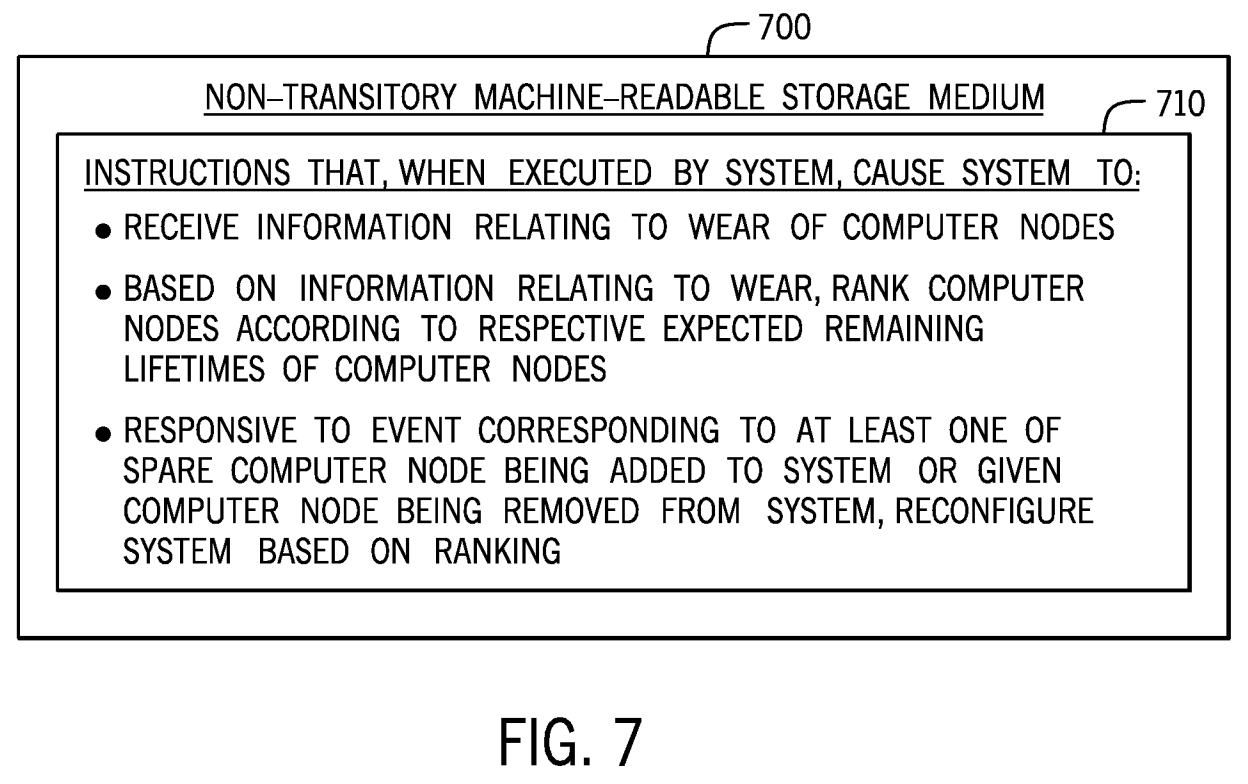

700

NON-TRANSITORY MACHINE-READABLE STORAGE MEDIUM

710

INSTRUCTIONS THAT, WHEN EXECUTED BY SYSTEM, CAUSE SYSTEM TO:

- RECEIVE INFORMATION RELATING TO WEAR OF COMPUTER NODES

- BASED ON INFORMATION RELATING TO WEAR, RANK COMPUTER NODES ACCORDING TO RESPECTIVE EXPECTED REMAINING LIFETIMES OF COMPUTER NODES

- RESPONSIVE TO EVENT CORRESPONDING TO AT LEAST ONE OF SPARE COMPUTER NODE BEING ADDED TO SYSTEM OR GIVEN COMPUTER NODE BEING REMOVED FROM SYSTEM, RECONFIGURE SYSTEM BASED ON RANKING

FIG. 7

DISTRIBUTED SYSTEM

800

810

COMPUTER NODE

INSTRUCTIONS TO:

- RECEIVE INDICATION OF EVENT CORRESPONDING TO CHANGING NUMBER OF PLURALITY OF COMPUTER NODES

- RESPONSIVE TO EVENT, IDENTIFY PARTICULAR COMPUTER NODE ASSOCIATED WITH EFFECTING CHANGE FROM POOL OF CANDIDATE COMPUTER NODES BASED ON RESPECTIVE WEAR LEVELS ASSOCIATED WITH CANDIDATE COMPUTER NODES

820

SYSTEM WEAR LEVELING

CROSS REFERENCE TO RELATED APPLICATIONS

This application claims the benefit under 35 U.S.C. § 119(e) of U.S. Provisional Application No. 63/345,691, entitled, "System Wear Leveling," which was filed on May 25, 2022, and which is hereby incorporated by reference in its entirety.

BACKGROUND

A distributed system includes multiple computer nodes that can run in parallel to provide increased processing throughput, as compared to single-node systems. The computer nodes can execute respective programs that are to perform corresponding operations.

BRIEF DESCRIPTION OF THE DRAWINGS

FIG. 7 is an illustration of machine-readable instructions stored on a non-transitory machine-readable storage medium to cause a system of computer nodes to be configured based on node wear-leveling information according to an example implementation.

DETAILED DESCRIPTION

Figure 1:
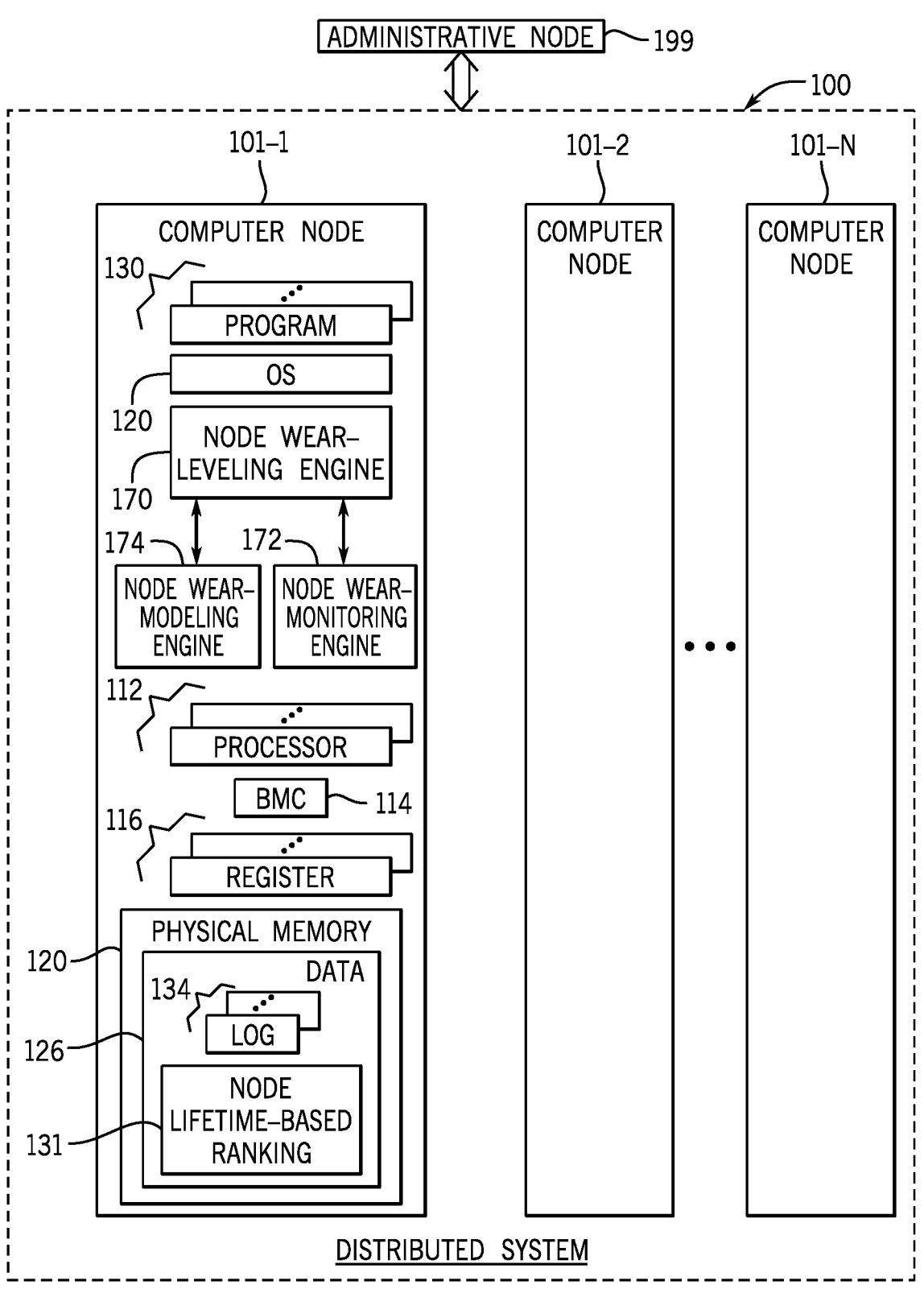
FIG. 1 is a block diagram of a non-virtualized distributed system of computer nodes according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology that is used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Due to such factors as ever-decreasing feature sizes (e.g., transistor channel widths), semiconductor devices, such as memory devices and central processing units (CPUs), tend to wear, or degrade, over time and eventually fail. Accordingly, the degradation of a computer node (e.g., a blade server or a rack server) over time may be at least in part attributable to the degradation of the node's semiconductor devices. In this context, a "computer node" refers to an actual, or physical, electronic device with a processing resource that is capable of executing machine-readable instructions. A computer node has a particular lifetime, which is the total time that the computer node is in use before the computer node no longer functions as intended (e.g., the computer node fails in whole or in part or exhibits a performance that has degraded to an unsatisfactory level). The remaining lifetime of a particular computer node is a function of the current degree of degradation, or wear, of the computer node.

A distributed computing system (called a "distributed system" herein) may have a pool of primary, or active, computer nodes, and the distributed system may have access to a pool (called a "spare pool" herein) of secondary, or spare, computer nodes. The spare computer nodes may, for example, provide replacements for failed active computer nodes and/or provide additional physical resources when the physical resources of the distributed system (and the number of active computer nodes) are scaled up. Active computer nodes may be returned to the spare pool of computer nodes (to decrease, or shed, physical resources) when the distributed system is scaled down. Scaling up and scaling down the distributed system are examples of what is referred to herein as "reconfiguring" the distributed system. In the context that is used herein, reconfiguring a distributed system refers to performing a process that includes at least one of removing a computer node from a distributed system of computer nodes or adding a computer node to the distributed system.

Reconfiguring a distributed system to add a computer node for purposes of scaling up the system involves selecting a spare computer node from the spare pool. One way to do this is to identify a specific spare computer node based on its associated node identifier (ID). For example, a node ID may be randomly or pseudo-randomly selected from the spare pool's node IDs. Another way to select a spare computer node is to select a node ID based on a particular numerical ordering scheme. For example, the spare pool may include spare computer nodes corresponding to node IDs 3, 8 and 12, and in a lowest-number-first selection scheme, the spare computer node having node ID 3 may be selected next. In a similar manner, reconfiguring a distributed system to remove an active node for purposes of scaling down the system may involve selecting one of the system's active computer nodes for removal based on a node ID.

Node selection schemes based solely on node ID fail to uniformly distribute wear among computer nodes, resulting in the distributed system's active computer node and the system's associated spare computer nodes having a wide range of remaining lifetimes. In this manner, some of the computer nodes may be underutilized therefore, have relatively longer expected remaining lifetimes, and other computer nodes may be overutilized (and having relatively more wear) and be on the brink of failure.

In accordance with example implementations that are described herein, a distributed system is reconfigured using a computer node selection process that is based on predicted, or expected, remaining lifetimes of the candidate computer nodes. Basing the selection on expected remaining lifetimes more uniformly distributes the wear among the computer nodes. This process of uniformly distributing the wear is referred to herein as "system wear leveling" or "node wear leveling." With system wear leveling, computer nodes that have relatively more wear are used less frequently (or not at all), and computer nodes that have relatively less wear are used more frequently. In general, the system wear leveling decreases, if not minimizes, the deviation among the expected remaining lifetimes of the computer nodes.

In accordance with example implementations, a node wear-leveling engine (e.g., an engine that is distributed across the active computer nodes of the distributed system) controls the selection of a particular computer node in connection with a reconfiguration (or configuration) of the distributed system. The reconfiguration may be any of a number processes to add and/or remove computer nodes. As an example, the reconfiguration may be an expansion of the distributed system's allocation of physical resources, such as a thickening of a thinly-provisioned distributed system or the upscaling of physical resources of a fully-provisioned distributed system to meet an increased application or job workload. As another example, the reconfiguration may be a scaling down of the distributed system's physical resources commensurate with a decreased application or job workload. As another example, the reconfiguration may involve adding and removing computer nodes in a process that leaves the number of active computer nodes of the distributed system intact. For example, a reconfiguration may include removing an active computer node of the distributed system for scheduled maintenance and replacing the removed computer node with a spare computer node.

The node wear-leveling engine, in accordance with example implementations, selects a given computer node from a pool of candidate computer nodes (e.g., active computer nodes or spare computer nodes) based on expected remaining lifetimes of the candidate computer nodes. The remaining lifetimes of the candidate computer nodes are estimated, or predicted, based on information relating to the wear of the computer nodes. More specifically, in accordance with some implementations, the node wear-leveling engine receives data representing wear indicators from a node wear-monitoring engine (e.g., an engine distributed across the active computer nodes of the distributed system). The node wear-monitoring engine, in accordance with example implementations, collects data corresponding to the wear indicators from the computer nodes (e.g., active computer nodes and spare computer nodes) that are associated with the distributed system. As described herein, the wear indicators represent or indicate, a degree of degradation, or wear, of physical resources associated with one or multiple physical resource types, or categories. In this manner, as further described herein, the wear indicators, for a particular computer node, may indicate, or represent, degrees of wear associated with physical resources of the computer node, and the physical resources may be categorized according to one or multiple of the following physical resource types: memories, processors, motherboards, I/O devices, network devices, storage devices, motherboards, expansion cards, riser cards, network cables and/or other physical resources.

The node wear-leveling engine, in accordance with example implementations, processes the information relating to wear of the computer nodes to provide data that represents wear indicators for the computer nodes. In accordance with example implementations, a node wear-modeling engine (e.g., an engine that is distributed across the active computer nodes of the distributed system) estimates, or predicts, remaining lifetimes for the computer nodes (e.g., active computer nodes and spare computer nodes) based on the wear indicators. The node wear-leveling engine, in accordance with example implementations, priorities, or ranks, the computer nodes according to their respective estimated remaining lifetimes to derive a prioritized list, called a "ranking" herein. As an example, the node wear-leveling engine may prioritize, or sort, the computer nodes according to a Most (remaining) Life, First Out (MLFO) order, so that the computer node having the greatest expected remaining lifetime appears at the top of the ranking, and the computer node having the least expected remaining lifetime appears at the bottom of the ranking. As another example, the node wear-leveling engine may sort the computer nodes in the reverse order so that the computer node having the least expected remaining lifetime appears at the top of the ranking, and the computer node having the greatest expected remaining lifetime appears at the bottom of the ranking. Regardless of the scheme used to order the computer nodes, the ranking may be used to efficiently identify the computer nodes having relatively small expected remaining lifetimes and efficiently identify the computer nodes having relatively large expected remaining lifetimes.

For a reconfiguration of the distributed system, the node wear-leveling engine may select a particular computer node to be added to or removed from the distributed system based on the ranking. The selection of a computer node based on remaining lifetime prioritization causes the wear among the computer nodes to be uniformly or nearly uniformly distributed, as compared to a selection process that does not consider computer node wear. As a more specific example, to select a computer node from the spare pool to add to the distributed system's active pool, the node wear-leveling engine may select the computer node that, according to the ranking, has the greatest expected remaining lifetime of the computer nodes in the spare pool. As another specific example, to select an active computer node (among a pool of active computer nodes) to be removed from the distributed system, the node wear-leveling engine may select the active computer node that, according to the ranking, has the least expected remaining lifetime of the computer nodes in the active pool.

In accordance with example implementations, the node wear-modeling engine may use machine learning to determine an expected remaining lifetime for a computer node based on wear indicators for the computer node.

In accordance with example implementations, the identification of a particular computer node may be based on one or multiple factors in addition to a priority of the computer nodes, as indicated by the ranking. For example, in accordance with some implementations, a scaling up reconfiguration may involve adding five additional computer nodes to the distributed system. The node wear-leveling engine may first identify a list of computer nodes (e.g., a list of the fifteen computer nodes having the respective fifteen greatest expected remaining lifetimes) based on the ranking. The node wear-leveling engine may then apply one or multiple other selection criteria (e.g., a random-based selection, a pseudo-random-based selection or a node ID-based selection) for purposes of selecting the five computer nodes from the list.

Although the node wear-leveling engine, the node wear-monitoring engine and node wear-modeling engine are described herein as being separate components, in accordance with further example implementations, one, two or all three of these components may be combined.

FIG. 1 is a block diagram of an example distributed system 100 that includes N computer nodes 101 (example computer nodes 101-1, 101-2 and 101-N being depicted in FIG. 1). The distributed system 100 is a non-virtualized system. Examples of virtualized systems are discussed further below in connection with FIGS. 3 and 4.

A computer node refers to an electronic device with a processing resource that is capable of executing machine-readable instructions. Examples of computer nodes can include server computers (e.g., blade servers, rack-based servers or standalone servers), desktop computers, notebook computers, tablet computers, and other processor-based systems. Specific components for computer node 101-1 are illustrated in FIG. 1 and discussed herein. It is noted that the other computer nodes 101 may have similar components in accordance with example implementations. In accordance with some implementations, the computer nodes 101 may be homogenous, or have the same or similar components.

The computer node 101 includes a collection of physical processors 112 (a single processor or multiple processors). As used here, a "collection" of items can refer to a single item or multiple items. A processor can include a microprocessor, a core of a multi-core microprocessor, a microcontroller, a programmable integrated circuit, a programmable gate array, or another hardware processing circuit. As more specific examples, the physical processor 112 may be a CPU core, a collection of CPU cores, a CPU semiconductor package (or "socket"), a GPU core, a collection of GPU cores or a GPU semiconductor package.

The computer node 101 also includes a physical memory 120, which can be implemented using a collection of physical memory devices. In general, the memory devices that form the physical memory 121, as well as other memories and storage media that are described are referenced herein, are examples of non-transitory machine-readable storage media (e.g., non-transitory storage media readable by a computer node 101 and/or readable by the distributed system 100). In accordance with example implementations, the machine-readable storage media may be used for a variety of storage-related and computing-related functions of the distributed system 100, such as, for example, storing machine-readable instructions, such as instructions relating to a node wear-leveling engine 170, a node wear-monitoring engine 172 and/or a node wear modeling engine 174, which are described further herein. As another example, the storage-related and computing-related functions of the machine-readable storage media may include storing and providing access to data associated with computing functions performed by the computer node 101, such as storing parameters, initial datasets, intermediate result datasets, final datasets, and data describing jobs to be executed by the computer node. As other examples, the storage-related and computing-related functions of the machine-readable storage media may include storing and providing access to machine-readable instructions and data pertaining to an operating system, a baseboard management controller (BMC), drivers, applications, firmware, network processing, security intrusion detection, security intrusion prevention, access privilege management, cryptographic processing, firmware validation, driver validation, and/or other instructions. As yet other examples, the storage-related and computing-related functions of the machine-readable storage media may include storing and updating data representing tables, rankings; mapping information; system management-related parameters, as well as storing and updating other data. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

The computer node 101-1 further includes an operating system (OS) 120 and a collection of programs 130 (e.g., application programs). Since the example distributed system 100 is a non-virtualized system, the OS 120 is a host OS (i.e., an OS that does not run in a virtual machine (VM)). Examples of OSes include any or some combination of the following: a Linux OS, a Microsoft WINDOWS OS, a Mac OS, a FreeBSD OS, and so forth. The application program(s) 130 and the OS 120 are executable on the collection of processors 112.

In accordance with example implementations, the distributed system 100 includes components to distribute a system wear, i.e., distribute a system wear among computer nodes that are associated with the distributed system 100. In this context, the computer nodes that are associated with the distributed system 100 may include active computer nodes (such as the computer nodes 101-1 to 101-N), as well as spare computer nodes that may be later added to the distributed system 100 and become active computer nodes. A "spare computer node" in the context refers to a currently inactive computer node, such as a dedicated spare computer node or a computer node that is currently an active computer node in another distributed system but may be removed from that system. The components to distribute wear among the computer nodes associated with the distributed system 100, in accordance with example implementations, include the node wear-leveling engine 170, the node wear-monitoring engine 172 and the node wear-modeling engine 174. In accordance with example implementations, one, two or all three of these components may be distributed among the computer nodes 101-1 to 101-N. For example, in accordance with some implementations, each computer node 101 may have software that forms a component of a distributed node wear-leveling engine 170. As another example, in accordance with some implementations, each computer node 101 may have software that forms a component of a distributed node wear-monitoring engine 172. As another example, in accordance with some implementations, each computer node 101 may have software that forms a component of a distributed node wear-modeling engine 174.

In accordance with some implementations, one, two or all three of the node wear-leveling engine 170, the node wear-monitoring engine 172 and the node wear-modeling engine 174 may be combined. Moreover, the individual functions of the node wear-leveling engine 170, the node wear-monitoring engine 172 and the node wear-modeling engine 174 may be distributed among these engines differently than what is described herein, in accordance with further implementations.

In accordance with some implementations, one or multiple of the node wear-leveling engine 170, the node wear-monitoring engine 172 and the node wear-modeling engine 174 may be located on a subset of computer nodes 101 less in number than N. For example, in accordance with some implementations, one or multiple of the engines may be located solely on the computer node 101-1. Moreover, in accordance with further implementations, instead of being located on the computer nodes 101, one, two or all three of the node wear-leveling engine 170, the node wear-monitoring engine 172 and the node wear-modeling engine 174 may be hosted by one or multiple management or administrative nodes for the distributed system 100, such as, for example, an administrative node 199.

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. Alternatively, an "engine" can refer to a combination of one or more hardware processing circuits and machine-readable instructions (software and/or firmware) executable on the one or more hardware processing circuits.

The node wear-monitoring engine 172, in accordance with example implementations, gathers, or collects, information, or data, related to system wear, i.e., information relating to wear of computer nodes associated with the distributed system 100. In accordance with example implementations that are described herein, the information relating to wear of the computer nodes may directly or indirectly indicate parameters that are referred to as "wear indicators" herein. In accordance with example implementations, the node wear-monitoring engine 172 may gather information related to wear from active computer nodes and regularly update the information so that the information is current. In this way, current information relating to the wear of a particular active computer node may be used to maintain an accurate prediction of the node's remaining lifetime.

Moreover, should an active computer node be inactivated and for example, returned to a spare pool, the expected remaining lifetime for the computer node is available and may be used to base decisions regarding whether or not to add the computer node back to the distributed system at a future time, as described herein. In accordance with some implementations, the node wear-monitoring engine 172 may gather information relating to wear from powered up spare computer nodes (e.g., spare computer nodes that have never been active in the distributed system 100), so that expected remaining lifetimes may be determined for these computer nodes and used to base decisions regarding whether or not to add these computer nodes to the distributed system 100 in the future.

The node wear-monitoring engine 172 may, for example, extract information relating to wear of the computer nodes 101 from stored data that is associated with the computer nodes 101. For example, the node wear-monitoring engine

172 may read information relating to the wear of the computer nodes 101 from hardware registers 116 (e.g., baseboard management controller (BMC) registers, network interface controller (NIC) registers, central processing unit (CPU) registers, motherboard registers, expansion card registers, add/or graphics processing unit (GPU) registers). As another example, the node wear-monitoring engine 172 may read information relating to the wear of the computer nodes 101 from logs 134 (e.g., system event logs and/or health logs) that are stored in storage associated with the computer nodes 101. As depicted in the example implementation of FIG. 1, the logs 134 for the computer node 101-1 are stored in the physical memory 120 of the computer node 101-1.

The node wear-monitoring engine 172 may take on one of many different forms, depending on the particular implementation. For example, in accordance with some implementations, the node wear-monitoring engine 172 may be disposed on one or multiple computer nodes 101. In accordance with further implementations, the node wear-monitoring engine 172 may be located on one or multiple administrative nodes, such as example administrative node 199.

In accordance with further implementations, the node wear-monitoring engine 172 may include BMCs 114 of the computer nodes 101. As used herein, a "BMC," or "baseboard management controller," is a specialized service processor that monitors the physical state of a server or other hardware using sensors and communicates with a management system through a management network. The BMC may also communicate with applications executing at the operating system level through an input/output controller (IOCTL) interface driver, a representational state transfer (REST) API, or some other system software proxy that facilitates communication between the BMC and applications. The BMC may have hardware level access to hardware devices that are located in a server chassis including system memory. The BMC may be able to directly modify the hardware devices. The BMC may operate independently of the operating system of the system in which the BMC is disposed. The BMC may be located on the motherboard or main circuit board of the server or other device to be monitored. The BMC may be mounted to another board that is connected to the motherboard. The fact that a BMC may be mounted on a motherboard of the managed server/hardware or otherwise connected or attached to the managed server/hardware does not prevent the BMC from being considered "separate" from the server/hardware. As used herein, a BMC has management capabilities for sub-systems of a computing device, and is separate from a processing resource that executes an operating system of a computing device. The BMC is separate from a processor, such as a central processing unit, which executes a high-level operating system or hypervisor on a system.

For example implementations in which the node wear-monitoring engine 172 includes BMCs 114, for a given computer node 101, a BMC 114 may, for example, read registers and event logs of the computer node 101 and process the data to drive data representing wear indicators. The BMC 114 may, for example, read the registers and/or event logs pursuant to a schedule and/or read the registers and/or event logs responsive to the occurrence of particular events of the computer node. In accordance with some implementations, the BMC 114 may store data in registers and/or a memory of the BMC 114, which may be read by the node wear-leveling engine 170. In accordance with further implementations, the BMC 114 may store data representing wear indicators in a memory outside of the BMC 114.

As another example, in accordance with some implementations, the node wear-monitoring engine 172 may include daemon processes (e.g., OS processes) of the computer nodes 101. As another example, the node wear-monitoring engine 172, in accordance with some implementations may be or include a chassis management controller. For example, a computer node 101 may be a blade server or a rack-based server disposed in a rack that contains the chassis management controller. As another example, the node wear-monitoring engine 172 may be formed by firmware that executes on the computer nodes 101. As another example, the node wear-monitoring engine 172 may be executed in a system management mode (SMM) on a computer node 101.

In accordance with example implementations, the node wear-leveling engine 170 processes the information relating to wear (which is provided by the node wear-monitoring engine 172) for purposes of deriving wear indicators for the computer nodes 101. As an example, the information relating to wear may directly indicate or represent a particular wear indicator. As an example, the node wear-leveling engine 170 may process the information relating to wear to derive a particular wear indicator. In accordance with further implementations, the node wear-monitoring engine 172 may process the information relating to wear gathered by the engine 172 to derive the wear indicators and provide data to the node wear-leveling engine 170 representing the wear indicators.

Any of a number of different wear indicators may be used to derive a measure of the degradation, or wear, of a given computer node 101 and/or an estimate of the remaining lifetime for the given computer node 101. As an example, a wear indicator may directly indicate the age of the computer node 101, such as the total time-in-use (e.g., a time that the computer node has been in service) of the computer node 101.

As another example, a wear indicator may represent a wear state of the physical memory of a computer node 101. For example, a wear indicator may be the accumulated number of memory bit errors logged over the history of the computer node 101. As another example, a wear indicator may be a current time rate (e.g., a time rate measured over a sliding time window that extends to or near the current time) of memory bit errors occurring in the computer node 101. As another example, a wear indicator may be the total number of times that the computer node 101 used self-healing measures (e.g., soft post package repair (sPPR), hard PPR (hPPR), rank sparing, and/or bank sparing) to repair physical memories. As another example, a wear indicator may be a current time rate of self-healing repairs performed by a computer node 101.

As other examples, a wear indicator may be the total number of times that the computer node 101 has applied a particular self-healing measure (e.g., sPPR, hPPR, rank sparing or bank sparing) over the computer node 101's lifetime or a current rate that a particular measure has been applied. As other examples, a wear indicator may be total number of memory bit error corrections (e.g., error correction code (ECC)) or the current time rate of memory bit error corrections performed by the computer node 101. As another example, a wear indicator may be the total time that a particular physical memory module of the computer node 101 has been in use. As another example, a wear indicator may be a model number of a memory module. As another example, a wear indicator may be a particular pattern of memory errors.

As another example, a wear indicator may represent a wear state of a physical processor (e.g., a CPU or GPU) of a computer node 101. Processor chips may fail after many processing cycles. Typically, as the processor degrades, temperatures rise. As the temperatures rise, the clock rate of the processor may be slowed down to reduce the risk of failure. While the processor may continue to operate in this degraded state (with the correct results still being computed), it will eventually fail if not remedied. In accordance with example implementations, wear indicator may indicate the total number of times that a particular CPU or GPU operated at a reduced frequency. As another example, a wear indicator may indicate the current time rate of a particular physical processor operating at a reduced frequency.

As an example, a wear indicator may indicate the total number of times that a particular physical processor has operated at an elevated temperature over its history. As another example, a wear indicator may indicate the current time rate of a particular processor operating at a reduced frequency. As another example, wear indicator may indicate the total time in use of a particular processor. As another example, a wear indicator may indicate the total number of times that a particular physical processor operated in a turbo mode at a frequency that exceeds a nominal maximum frequency for the processor at an elevated temperature. As another example, a wear indicator may indicate the current time rate of a particular processor operating in the turbo mode. As another example, a wear indicator may indicate a total number of errors associated with a cache of a processor or a current time rate of errors associated with a cache of a processor. As another example, a wear indicator may be a current average number of cycles per instruction for the processor. As another example, a wear indicator may be a current rate of level one (L1) cache or level 2 (L2) cache hits. As another example, a wear indicator may be a current rate of L1 cache or L2 cache misses. As another example, a wear indicator may be a model number of a processor. As another example, a wear indicator may be a particular of errors. As another example, one or multiple wear indicators may be performance parameter(s) that are provided by a performance monitoring unit (PMU) of the processor.

As another example, a wear indicator for the computer node 101 may indicate a wear state of a motherboard or another board (e.g., a riser card or mezzanine card) of the computer node 101. For example, a wear indicator may be a model number of a motherboard, a date that the motherboard was first placed in service, or an accumulated time of use of the motherboard.

As another example, a wear indicator for a computer node 101 may indicate a wear state of firmware or software of the computer node 101. As examples, a wear indicator may be a version or a signature of a Unified Extensible Firmware Interface (UEFI) image or a version of a UEFI driver. As another example, a wear indicator may be a version or a signature of a basic input/output system (BIOS) image. As another example, a wear indicator may be a version or a signature a container build file. As another example, a wear indicator may be a version or a signature of a firmware management stack of a BMC of a computer node 101. As another example, a wear indicator may be a version of signature of an operating system of a computer node 101.

As other examples, a wear indicator may be an age or a network cable associated with the computer node 101, a total number of errors associated with a particular network interface controller (NIC) of the computer node 101, a current rate of errors associated with a NIC, a total accumulated time in use of the NIC, or a version of the NIC. As other examples, a wear indicator may be total number of errors or a current rate of errors with a storage device of the computer node 101. As other examples, a wear indicator may be a history of a particular fault for the computer node 101, such as a history of temperature faults. As another example, a wear indicator may be an age or version of a power supply of the computer node 101. As another example, a wear indicator may be an age or version of a fan of the computer node 101. As another example, a wear indicator may be a thermal management history of the computer node 101. As another example, a wear indicator may be a history or number of security check failures, a history or number of security intrusion detections, or a history or number of physical tampering detections. As another example, a wear indicator may be a service history of the computer node 101 (e.g., data representing a pattern of hardware component replacements, whether certain hardware components have been replaced, issues with the computer node 101, and/or an error log resulting in the servicing of the computer node 101).

The node wear-leveling engine 170, in accordance with example implementations, receives data from the node wear-monitoring engine 172 representing the wear indicators for a given computer node 101 and uses the node wear-modeling engine 174 to determine an expected remaining lifetime for the computer node 101 based on the wear indicators. The node wear-leveling engine 170 may also, in accordance with example implementations, construct a multi-dimensional feature vector from the wear indicators and provide the feature vector to the node wear-modeling engine 174. The node wear-modeling engine 174 may then, based on the feature vector, provide data back to the node wear-leveling engine 170, which represents an expected remaining lifetime. As examples, the feature vector may be a tuple containing a selected set of wear indicators, a tuple containing a weighted set of wear indicator, a tuple containing a selected subset of the wear indicators, or in general, a combination or wear indicators or features derived from wear indicators.

In accordance with example implementations, the node wear-leveling engine 170 ranks, or prioritizes, the expected node remaining lifetimes for all computer nodes (e.g. active and spare computer nodes) associated with the distributed system 100 into a node lifetime-based ranking 131. The node wear-leveling engine 170 may, for example, update the node lifetime-based ranking 131 as expected node remaining lifetimes are updated. As depicted in FIG. 1, the node lifetime-based ranking 131 may be stored as data 126 in the physical memory 120. In accordance with some implementations, the node wear-leveling engine 150 prioritizes, or ranks, the computer nodes according to an MLFO algorithm.

The node wear-leveling engine 170 may, responsive to reconfigurations of the distributed system 100, identify, or select, computer nodes to be added or removed, based on the node lifetime-based ranking 131. More specifically, in accordance with some implementations, for purposes of adding spare computer nodes, the node wear-leveling engine 170 selects, based on the ranking 131, nodes having the greatest expected remaining lifetimes. As another example, in accordance with some implementations, for purposes of removing computer nodes 101 from the distributed system 100, the node wear-leveling engine 170 selects the computer nodes 101 having the least expected remaining lifetimes.

In accordance with further implementations, the ranking 131 may serve as one or multiple factors considered by the node wear-leveling engine 170 in evaluating whether a particular computer node should be selected for a reconfiguration of the distributed system 100. For example, in accordance with some implementations, the node wear-leveling engine 170 may prioritize selection of a particular spare computer node if the spare compute node has a relatively long expected remaining lifetime, but the node wear-leveling engine 170 may consider, for example, whether the spare computer node is currently part of a lower priority system (and thereby would be removed from this system) or currently not affiliated with any other system. As another example, in accordance with some implementations, the node wear-leveling engine 170 may identify a list of a predetermined number of computer nodes from the ranking 131 and further base selection of one or multiple computer nodes from the list on one or multiple other criteria (e.g., the selection process may include randomly or pseudo-randomly selecting computer node(s) from the list and/or may include further basing the selection on a node ID).

The node wear-leveling engine 170 may take on one of many different forms, depending on the particular implementation. For example, the node wear leveling engine 170 may be part of the OS 120. As other examples, the node wear-leveling engine 170 may be or include a BMC, a chassis controller, an operating system daemon, or firmware. In accordance with some implementations, the node wear-leveling engine 170 may be disposed on one or multiple computer nodes 101. In accordance with further implementations, the node wear-leveling engine 170 may be located on one or multiple administrative nodes, such as example administrative node 199.

In accordance with some implementations, the node wear-modeling engine 174 may, based on information relating to wear of the computer nodes 101 (e.g., a feature vector provided by the node wear-leveling engine 170), estimate respective remaining lifetimes of the computer nodes associated with the distributed system 100. In accordance with some implementations, the node wear-modeling engine 174 may be disposed on one or multiple computer nodes 101. In accordance with further implementations, the node wear-modeling engine 174 may be located on one or multiple administrative nodes, such as example administrative node 199.

As an example, the node wear-modeling engine 174 may use supervised learning, in which a machine learning model may be initially trained based on labeled training data. As an example, the labeled training data may be derived from a knowledge database and/or expert guidance. As a more specific example, the training data may represent a history of observed computer nodes, their actual lifetimes, benchmarks corresponding to events occurring with the computer nodes, and, in general, data gathered from the computer nodes during their active services. As further described herein, in accordance with some implementations, the training data may be gathered in the service and/or inspection of a particular computer node whose lifetime has been estimated by the node wear-modeling engine 174 for purposes of providing feedback to refine the lifetime estimates that are provided by the engine 174.

In accordance with further implementations, the node wear-modeling engine 174 may use unsupervised machine learning. As other examples, the node wear-modeling engine 174 may use other types of machine learning (other than supervised or unsupervised learning), such as, reinforcement learning or semi-supervised machine learning.

A machine learning model used by the node wear-modeling engine 174 to estimate remaining node lifetimes may take on any of a number of different forms, depending on the particular implementation. As examples, the model may be an artificial neural network (ANN), a decision tree, a support vector machine (SVM), a regression process, a Bayesian network, a Gaussian process or a genetic algorithm.

In accordance with some implementations, the node wear-leveling engine 170 may prioritize wear indicators to form a feature vector that is provided by the engine 170 to the node wear-modeling engine 174. For example, in accordance with some implementations, the node wear-leveling engine 170 may assign wear indicator weights and/or select wear indicators for the feature vector for purposes of prioritizing processor-related wear indicators (e.g., prioritize a current rate of under frequency operation and/or a current rate of overtemperature occurrences) and memory-related wear parameters (e.g., prioritize occurrences of a certain memory error pattern and/or a certain pattern of self-healing measures) relative to wear parameters associated with other computer node subsystems. In accordance with some implementations, the prioritization of wear indicators and/or a corresponding bias that is built into the machine learning model may be used to steer the classifications made by the node wear-modeling engine 174. In accordance with further implementations, the node wear-leveling engine 170 may observe over time that some wear indicators have greater influences on estimated node lifetimes than other wear indicators and correspondingly tailor the feature vector to include the more influential wear indicators and not include other less influential wear indicators.

In accordance with further example implementations, the node wear-modeling engine 174 may not use machine learning to estimate remaining node lifetimes. For example, the node wear-modeling engine 174 may use a tuple of wear level indicators as an index to look up an expected remaining lifetime from a table. As another example, in accordance with some implementations, the node wear-modeling engine 174 may apply different weights to wear indicator values (to give correspondingly assign greater preferences to some wear indicators than others) and apply a mathematical function to the weighted wear indicator values derive the expected remaining lifetime. For example, weights may prioritize processor-related wear indicators (e.g., prioritize a current rate of under frequency operation and/or a current rate of overtemperature occurrences) and memory-related wear parameters (e.g., prioritize occurrences of a certain memory error pattern and/or a certain pattern of self-healing measures) relative to wear parameters that are associated with other computer node subsystems.

In accordance with some implementations, the distributed system 100 may be associated with an administrative node 199. In general, the administrative node 199 may issue commands related to setting up and managing the distributed system 100. For example, in accordance with some implementations, the administrative node 199 may monitor a job or application workload of the distributed system 100 and, in response thereto, initiate (e.g., manually through an administrative console or automatically, depending on the particular implementation) a reconfiguration to scale up or scale down the distributed system 100. As part of the reconfiguration, the administrative node 199 may communicate a request to the node wear-leveling engine 170, requesting the node wear-leveling engine 170 to identify one or multiple computer nodes (e.g., active computer nodes to shed or computer nodes from a spare pool to add) related to the reconfiguration. The administrative node 199 may perform other actions pertaining to the management of the distributed system 100, in accordance with example implementations. In accordance with some implementations, one or multiple administrative nodes 199 may perform some or all of the functions described herein for the node wear-leveling engine 170, node wear-monitoring engine 172 and node wear-modeling engine 174.

Figure 2:
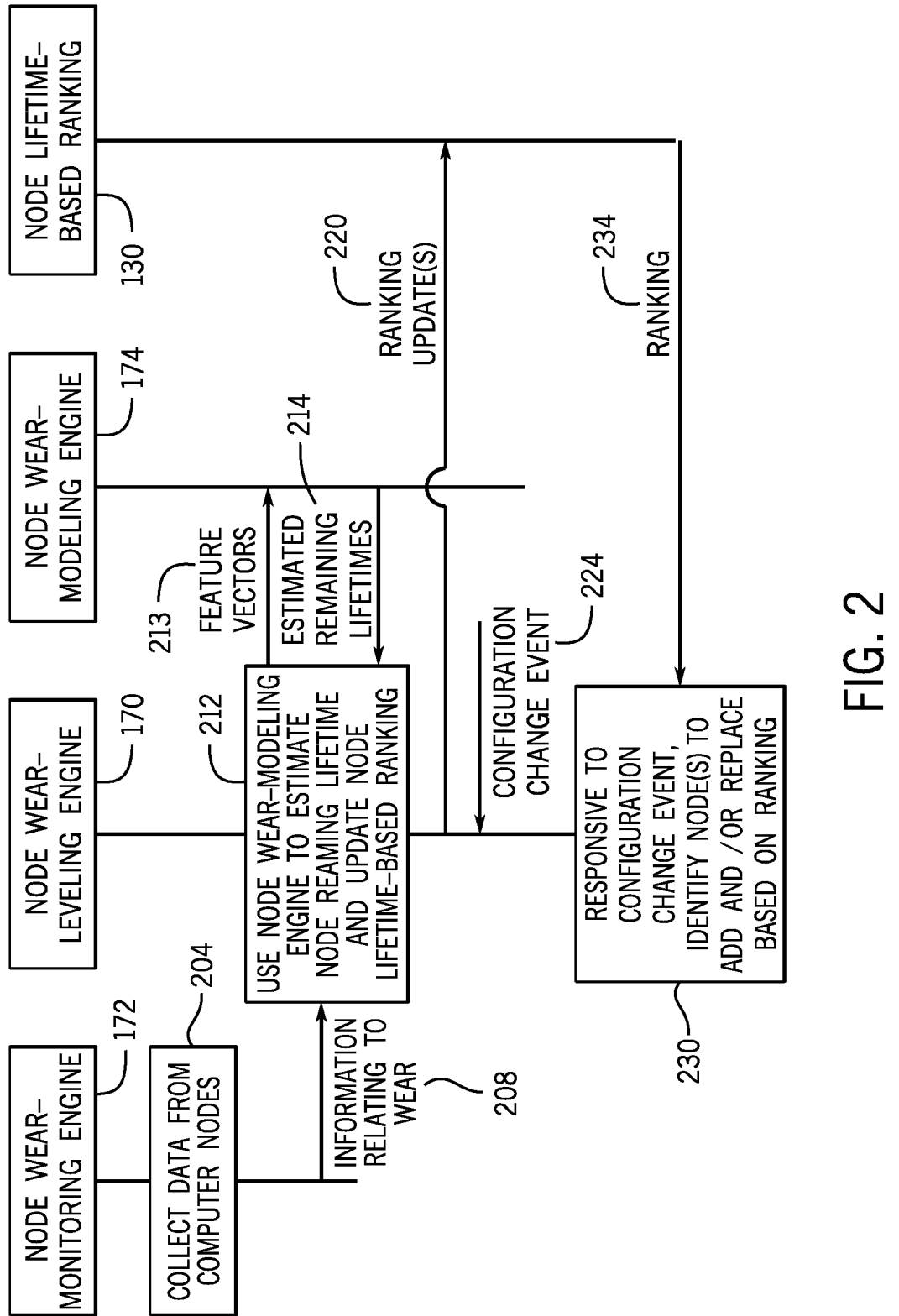
FIG. 2 is a flow diagram of a node wear-leveling technique according to an example implementation.

In accordance with example implementations, a technique that is depicted in FIG. 2 may be used to reconfigure a distributed system. Referring to FIG. 2, the technique includes a node wear-monitoring engine 172, at 204, collecting data from computer nodes associated with the distributed system and providing information 208 relating to wear of the computer nodes to a node wear-leveling engine 170. The node wear-leveling engine 170 may, responsive to the information 208 relative to wear and as depicted at 212, use a node wear-modeling engine 174 to estimate node remaining lifetimes 214. More specifically, using the node wear-modeling engine 174 may include providing feature vectors to the node wear-modeling engine 174, as depicted at 213, and receiving estimated node remaining lifetimes 214 from the node wear modeling engine 174. As depicted at 220, the node wear-leveling engine 170 may perform updates 220 to a node lifetime-based ranking 131 in response to the estimated node remaining lifetimes 214.

In response to a configuration change event 224, the node wear-leveling engine 170 may then, as depicted at 230, respond to the configuration event. This response may include identifying one or multiple computer nodes to be added and/or replaced based on the node lifetime-based ranking 131.

Figure 3:
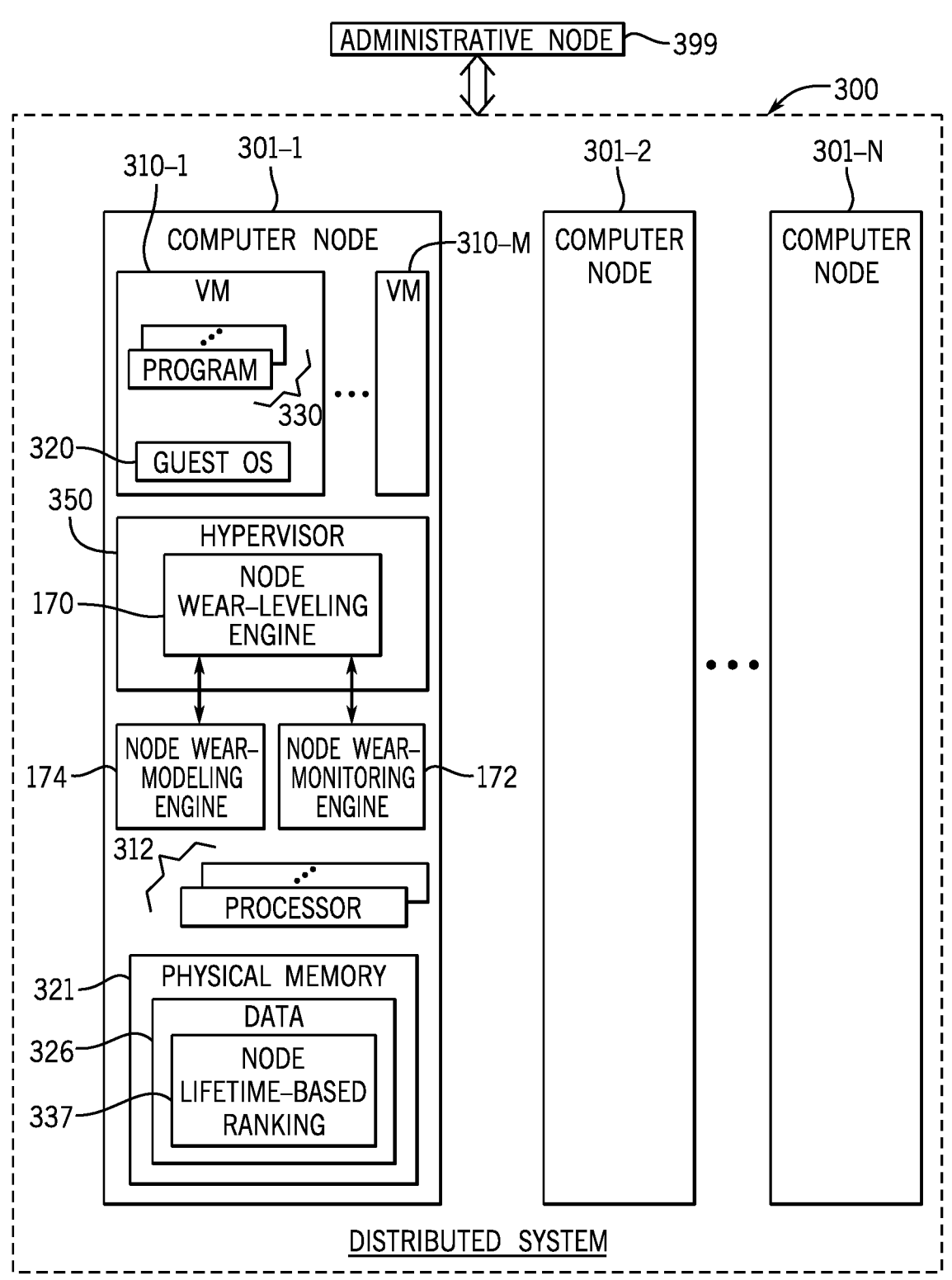
FIGS. 3 and 4 are block diagrams of virtualized distributed systems according to example implementations.

FIG. 3 is a block diagram of a virtualized distributed system 300 according to example implementations. The distributed system 300 includes N computer nodes 301 (example computer nodes 301-1, 301-2 and 301-N, being depicted in FIG. 3). Each computer node 301 of the distributed system 300 includes VMs. For example, the computer node 301-1 may include M VMs 310 (example VMs 310-1 and 310-M, being depicted in FIG. 3). The VMs 310 are executable on a collection of processors 312 of the computer node 301-1. The computer nodes 301-2 to 301-N may include similar components as the computer node 301-1.

The VM 310-1 includes a guest OS 320 and a collection of programs 330 that are executable on the VM 310-1. Address mapping information may also be provided for the VM 310-1, which maps between guest physical addresses of a guest physical memory address space of the VM 310-1 and physical addresses of a physical address space. The guest physical address space refers to locations of a guest physical memory. From the point of view of the guest OS 320, the guest physical memory is treated as a physical memory. However, the guest physical memory is actually virtual memory provided by a hypervisor 350 in the computer node 301-1. The hypervisor 350 manages the sharing of a physical memory 321 in the computer node 301-1 among the VMs 310. The other VMs 310-2 to 310-M may include components similar to the VM 310-1.

In accordance with example implementations, the hypervisor 350 includes a node wear-leveling engine 170. In other examples, the node wear-leveling engine 170 or component thereof may be part of the computer node 301-1 but separate from the hypervisor 350. In accordance with example implementations, the computer node 301-1 may also include at least part of (e.g., a part of a distributed engine) of a node wear-monitoring engine 172 and/or a node wear-modeling engine 174. In accordance with some implementations, one or both of the node wear-monitoring engine 172 and the node wear-modeling engine 174 or parts therefore may be contained within the hypervisor 350. Moreover, in accordance with further example implementations, instead of being hosted on the computer nodes 301, one, two or all of the node wear-leveling engine 170, the node wear-monitoring engine 172 and the node wear-modeling engine 174 may be hosted by one or multiple management, or administrative nodes, such as administrative node 399.

In accordance with some implementations, the administrative node 399 may issue commands related to setting up and managing the distributed system 300, including, as part of a reconfiguration of the distributed system 300 initiating request for the node wear-leveling engine 170 to identify one or multiple computer nodes related to the reconfiguration. The administrative node 399 may perform other actions pertaining to the management of the distributed system 300, in accordance with example implementations.

Figure 4:
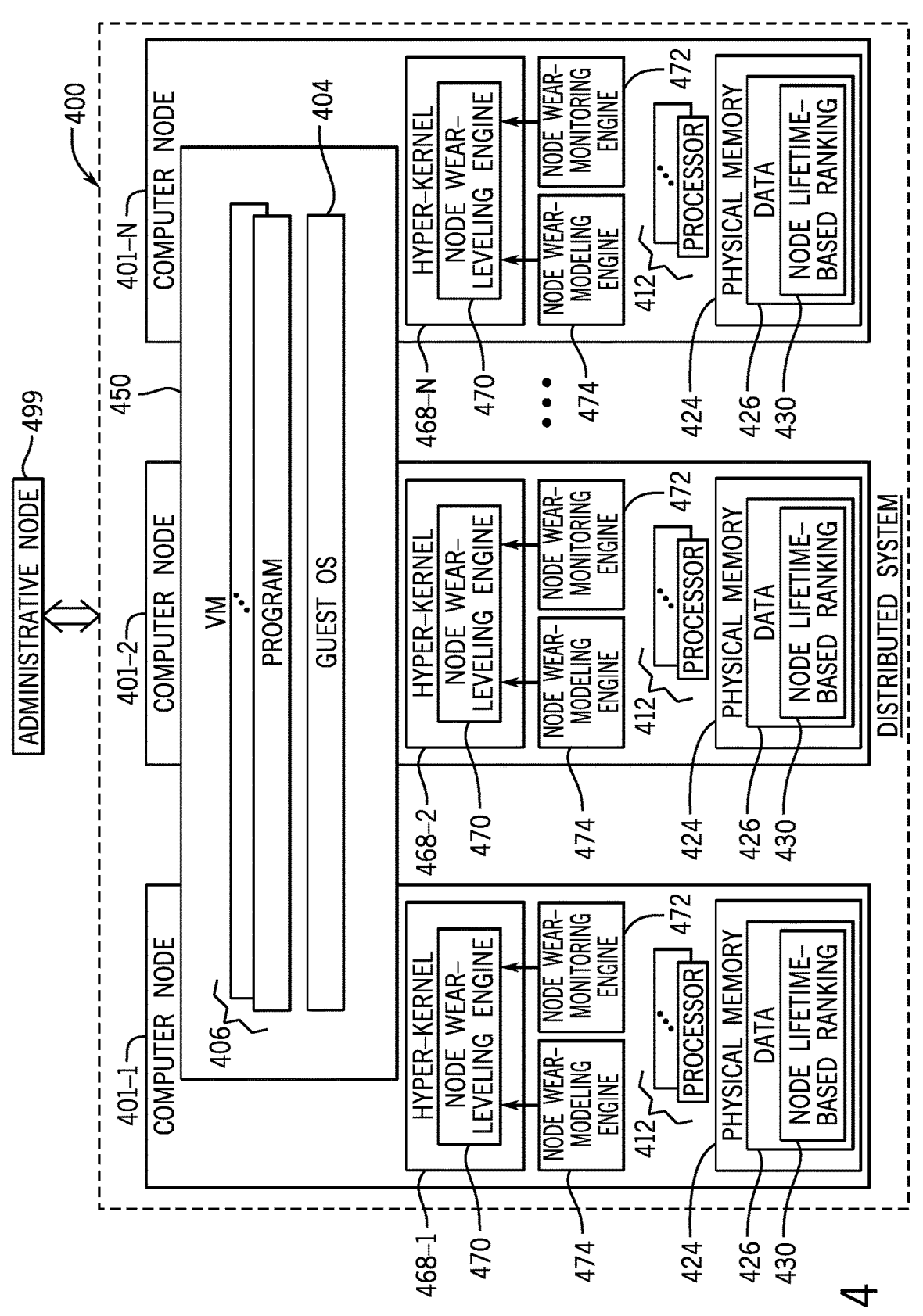

FIG. 4 is a block diagram of a virtualized distributed system 400 according to further example implementations. In the distributed system 400, instead of running one or more VMs in each respective computer node, a VM 450 can run across N multiple computer nodes 401 (computer nodes 401-1, 401-2 and 401-N, being depicted in FIG. 4). Although FIG. 4 shows one VM 450, note that there can be at least one other VM that can run across the multiple computer nodes 401-1 to 401-N. The arrangement depicted in FIG. 4 is referred to herein as a "software-defined server," or "SDS," because the computer nodes 401-1 to 401-N collectively form one virtual machine (VM) 450 that hosts a guest operating system (OS) 404.

The VM 450 includes the guest OS 404 and a collection of programs 406 that run in the VM 450. Address mapping information 408 is maintained for the VM 450 that maps guest virtual memory addresses of a guest physical memory address space that refers to locations of a host virtual memory to physical addresses of a hyper-kernel physical address space. The hyper-kernel physical address space is a physical address space provided by a hyper-kernel. From the point of view of the guest OS 404, the guest physical memory is treated as a physical memory. However, the guest physical memory is actually a virtual memory that is provided by N hyper-kernels 468 (hyper-kernels 468-1, 468-2 and 468-N being depicted in FIG. 4) running in respective computer nodes 401-1 to 401-N.

In accordance with example implementations, the hyper-kernels 468 perform the mapping of guest physical memory addresses to real physical memory addresses. The guest OS 404 performs the mapping of guest virtual memory addresses to guest physical memory addresses (using first level page table mappings). From the viewpoint of the guest OS 404, the guest physical memory addresses appear to be real physical memory addresses but are not. The VM 450 may maintain a virtual resource map that describes, from the point of view of the guest OS 404, the virtual resources that are available to the guest OS 404. In accordance with example implementations, the hyper-kernels 468 use second level page table hardware and second level address mapping information to map guest physical memory addresses to real physical memory addresses. Each hyper-kernel 468 has address mapping information that, from the viewpoint of the hyper-kernel 468, is a current resource mapping between the virtual resource map and the physical resources that are managed by the hyper-kernel 468. In accordance with example implementations, each hyper-kernel 468 has resource mapping information that describes the physical resources that are managed by the hyper-kernel 468.

A hyper-kernel is software on each physical computer node that functions as part of a distributed hypervisor. The hyper-kernels 468 communicate with each other to collectively perform tasks of a hypervisor. Each hyper-kernel 468 can observe the distributed system 400 running in real time and optimize system resources of the respective computer node 401 to match the requirements of the distributed system 400 during operation. The hyper-kernels 468 unify the hardware resources of the computer nodes 401 and present the unified set to the guest OS 404. Hardware resources of the distributed system 400 include physical processors 412, physical memories 424 and other physical resources (e.g., network communication resources, input/output (I/O) resources, etc.) of the respective computer nodes 401. Because of this abstraction, the guest OS 404 will have the view of a single large computer, containing an aggregated set of processors, memories, I/O resources, network communication resources, and so forth.

In accordance with example implementations, each hyper-kernel 468 includes a respective node wear-leveling engine 470. For example, the hyper-kernel 468-1 includes a node wear-leveling engine 470, the hyper-kernel 468-2 includes a node wear-leveling engine 470, and the hyper-kernel 468-N includes a node wear-leveling engine 470. Each of the node wear-leveling engines 470 performs similar operations as the node wear-leveling engine 170 of FIG. 1. In other examples, the node wear-leveling engines 470 may be external of the respective hyper-kernels 468.

In accordance with example implementations, each computer node 401 includes a node wear-monitoring engine 472 and a node wear-modeling engine 474. In accordance with example implementations, the node wear-monitoring engine 472 and the node wear-modeling engine 474 may be similar to the node wear-monitoring engine 172 and the node wear-modeling engine 174, respectively, of FIG. 1.

In accordance with further example implementations, one, two or all three of the node wear-leveling engine 470, the node wear-monitoring engine 472 and the node wear-modeling engine 474 may be combined. Moreover, in accordance with further example implementations one, two or all three of the node wear-leveling engine 470, the node wear-monitoring engine 472 and the node wear-modeling engine 474 may be hosted on one or multiple management or administrative nodes, such as administrative node 499.

The guest OS 404 in the VM 450 is presented with virtual processors (also referred to as virtual central processing units or vCPUs) that are virtualized representations of the physical processors 412 of the computer nodes 401, as presented by the distributed hypervisor made up of the hyper-kernels 468. As an example, if there are five computer nodes and each computer node has 100 physical processors, then the distributed hypervisor presents the guest OS 404 with 500 virtual processors that are part of a single SDS. In actuality, there are five physical computer nodes each with 100 physical processors.

Figure 5:
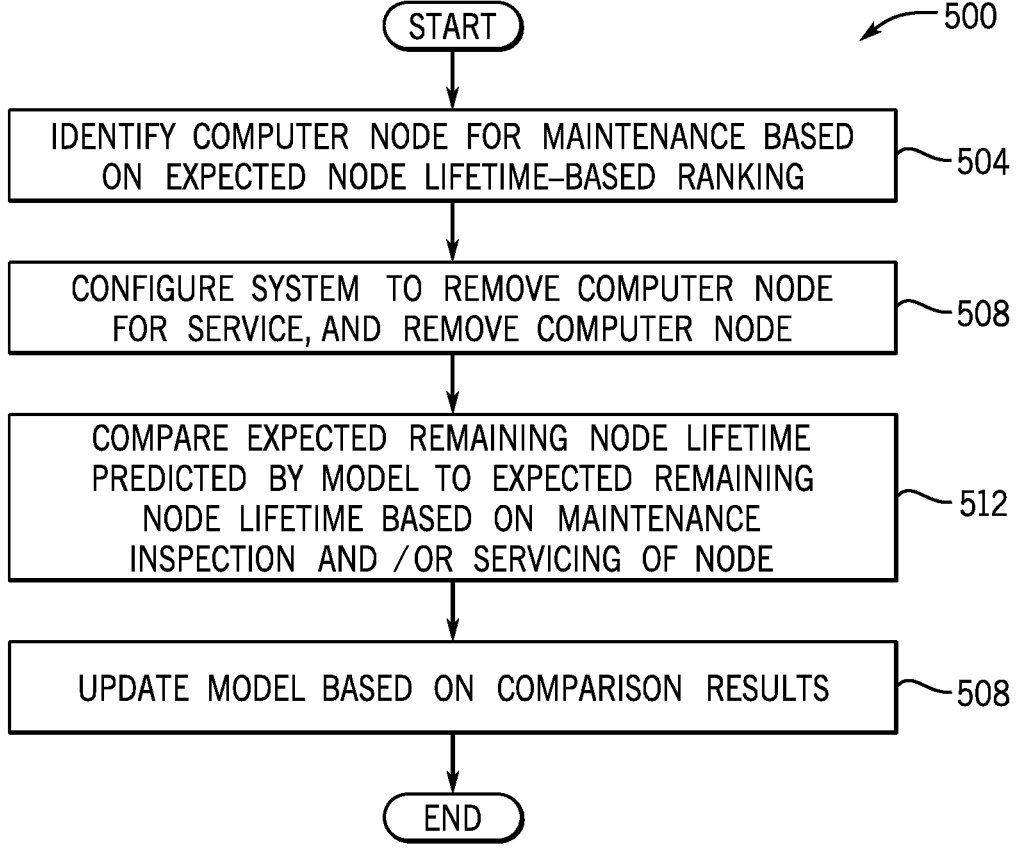
FIG. 5 is a flow diagram depicting a technique to update a node wear model according to an example implementation.

In accordance with example implementations, a technique 500 that is depicted in FIG. 5 may be used to update the node wear model. In accordance with some implementations, the technique 500 may be performed by the node wear-leveling engine. In accordance with example implementations, the technique 500 includes identifying (block 504) a computer node for maintenance based on an expected node lifetime-based ranking. Pursuant to block 508, a system containing the identified computer node may then be reconfigured to remove the computer node for service. Pursuant to block 512, a maintenance inspection and/or servicing of the node may then be performed for purposes of deriving an expected remaining node lifetime. This expected node lifetime derived via the servicing/inspection of the computer node may be compared to the expected remaining lifetime of the node provided by the node wear-modeling engine.

As an example, performance and health analyses may be run on computer node to check for a variety of indicators of the computer node's expected remaining lifetime. As an example, the analyses may check the computer node's storage usage, CPU usage and memory usage. As another example, the analyses may evaluate a power consumption of the computer node. As another example, the analyses may involve determine whether the computer node is exhibiting anomalous behavior, as compared to observed behaviors of other computer nodes. In accordance with example implementations, the results of the analyses may be used to determine whether the computer node may be classified as belonging in a cluster associated with a particular estimated remaining lifetime. This classification may or may not involve the use of machine learning, depending on the particular implementation.

In accordance with some implementations, the results of the performance and health analyses that are conducted on the computer node may be used to independently derive an estimated remaining lifetime of the computer node. The model may then be updated based on the comparison, as depicted in block 516. For example, in accordance with some implementations, the independent determination of the expected remaining lifetime, in conjunction with the information relating to the wear of the computer node (which is derived by the node wear-leveling model) may be used to form labeled training data that serves as supervised feedback to the node wear-modeling engine.

Figure 6:
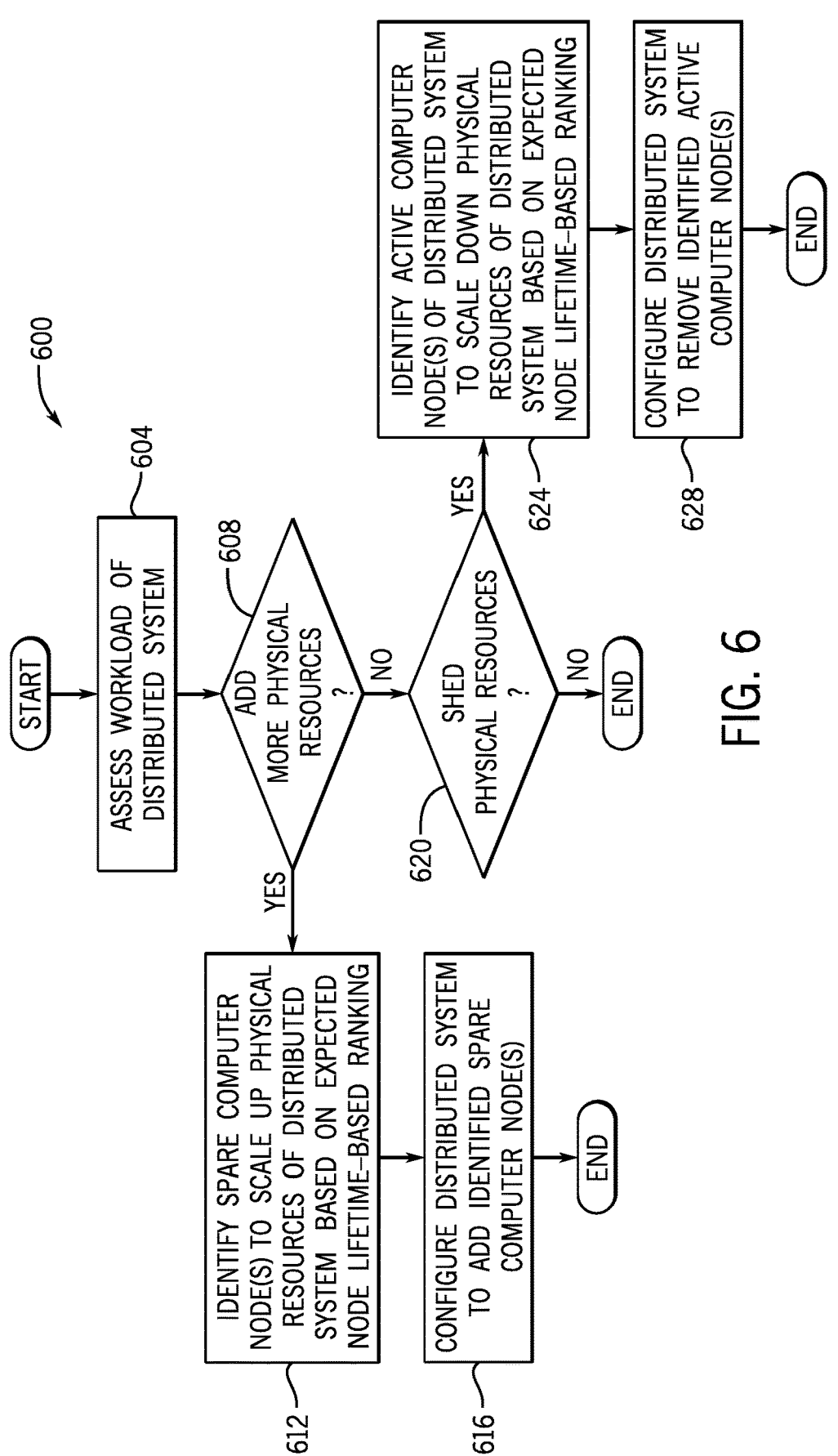
FIG. 6 is a flow diagram depicting a technique to scale up or scale down physical resources of a distributed system according to an example implementation.

Referring to FIG. 6, in accordance with some implementations, a technique 600 may be used to reconfigure a distributed system. As an example, the technique 600 may be performed by the node wear-leveling engine, in accordance with some implementations. Referring to FIG. 6, the process 600 includes assessing a workload (e.g., a job and/or application workload) of the distributed system, pursuant to block 604. Based on the assessment, a determination may then be made (decision block 608) whether more physical resources should be added to the distributed system. If so, then, pursuant to block 612, one or multiple spare computer nodes are identified to scale up the physical resources of the distributed system based on the expected node lifetime-based ranking. In this manner, in accordance with some implementations, the identified spare computer node(s) may be the spare node(s) having the greatest expected remaining lifetime(s). Pursuant to block 616, the distributed system may then be configured to add the identified spare computer node(s).

The process 600 may also include determining (decision block 620) whether physical resources of the distributed system are to be removed, or shed, based on the assessed workload. If so, then, pursuant to block 624, one or multiple active computer nodes of the distributed system are identified, pursuant to block 624, to scale down the physical resources of the distributed system based on the expected node lifetime-based ranking. In this manner, accordance with some implementations, the ranking may be used to identify the active computer node(s) having the least expected remaining lifetime(s). Pursuant to block 628, the distributed system may then be configured to remove the identified active computer node(s) from the distributed system.

Referring back to FIG. 4, turning now to more specific details of the SDS 400 of FIG. 4, in accordance with some implementations, the SDS 400 may use resource maps to translate between virtual and physical configurations. For example, in accordance with some implementations, the resource maps of the SDS 400 may include a physical resource map, an initial resource map and a current resource map.

A "physical resource map" is a table that describes the physical resources that are available on each node. It contains, for example, the number and type of the processors on each node, the devices, the memory available and its range of physical addresses, etc. In accordance with example implementations, this table is read-only and is fixed at boot time.

An "initial virtual resource map" is fixed prior to the booting of the guest operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of an Ethernet controller in the virtualized machine may at different times refer to different hardware controllers. The current resource map is used by the hyper-kernel to dynamically modify the virtual hardware resource mappings, such as the virtual memory subsystem, as required.

The hyper-kernel of the SDS 400 provides a dynamic adaptive reconfiguration framework, which enhances system availability in a datacenter context by allowing dynamic reconfiguration of the SDS 400 without downtime due to failures or required (or desired) elasticity capacity changes to improve the efficient utilization of computing resources. That is, this additional layer of the hyper-kernel allows for dynamic adaptive reconfiguration of the SDS 400 while the system is running, without having to bring the system down.

Dynamic reconfiguration, as referred to herein, refers to the capability of changing or modifying the set of hardware components implementing or supporting an SDS 400, while the system continues to run a guest OS 404 and its applications. For example, using the techniques described herein, the resources of a distributed multiserver architecture may be reconfigured while an operating system running across the multi-server architecture continues to run, without having to be rebooted, and without any disruption to a running application.

In accordance with example implementations, physical hardware components of the SDS 400 may be grouped and these groups may be associated with respective resilient logical modules (also called "logical modules" herein). In accordance with example implementations, as compared to physical hardware components a logical module has a relatively graceful failure mode, rather than an immediate catastrophic failure. As described herein, a graceful failure involves a transition to a degraded state such that the SDS 400 continues to function and no data is lost; depending on the degree of redundancy of available hardware, a later failure may be catastrophic if the failing component is not replaced.

This type of approach, in which a SDS 400 includes resilient logical modules, which through dynamic reconfiguration, allow a relatively high level of availability (e.g., "continuous availability" with an arbitrary number of "9's" of availability), despite physical hardware disruptions (e.g., due to hardware failures, physical resource scaling, etc.). The primary causes of data center downtime typically have to do with shrinking the system capacity, growing the system capacity, and component failures while running (where outage times increase as existing data center systems become larger). Using the resiliency/reconfiguration mechanisms described herein, these causes need not result in any downtime of the SDS 400. This also minimizes outage costs due to hardware (e.g., component failures, reconfiguration, repairs, etc.) by allowing for fail in place/scheduled repair, hot spares, etc., as will be described in further detail below. The outage costs due to software (e.g., software bugs, operator error, overload, etc.) are also reduced by allowing thin provisioning, which will be described in further detail below.

As described above, the dynamic reconfiguration mechanism described herein allows for various enhancements in system availability in a datacenter context, examples of which, without limitation, are by allowing dynamic reconfiguration of a SDS 400 without downtime due to failures, and by allowing required or desired elasticity capacity changes to improve the efficient utilization of computing resources. Using the techniques described herein, continuing operation of the SDS 400 is achieved despite hardware disruption (e.g., component failure, rescaling, etc.). Further details regarding such enhancements are described in further detail below.

The ability to facilitate required or desired capacity changes to the SDS 400 (i.e., dynamic reconfigurability of the SDS 400) is referred to herein as "thin-provisioning" of the SDS 400. One advantage of the hyper-kernel described above is that it creates a layer of software in between a guest OS 404 and the underlying hardware. As a result, the hardware and the guest OS 404 and its applications are more loosely coupled as compared to previous data centers. Thin provisioning leverages and exploits this loose coupling, allowing available virtual resources to move from hardware node to node, and be remapped onto physical resources dynamically (e.g., via the resource migration techniques described above). For example, storage volumes, memory, and central processing units may be instantiated by physical resources as needed, rather than be chosen and fixed in capacity for the duration of operation of the SDS 400. As one example, a SDS 400 may be started with 1 TB (terabyte) of physical DRAM (dynamic random access memory) and 10 physical processors, and then later on have its physical instantiation be upgraded, while the system is running, to have more DRAM and more CPUs, without having to restart the guest OS 404.

Because virtual memory pages, virtual CPUs, Input/Output (I/O) devices, and other virtual resources are mobile throughout the SDS 400, and are dynamically reconfigurable, the virtual machine supported/presented by the hyper-kernel, using the techniques described herein, may add and remove sufficient physical resources that support the virtual resources, and then automatically re-maps them to additional or different physical resources. This provides flexibility to scale the system's hardware capacity up and down with a workload's requirements, as needed, resulting in a more efficient utilization of computing resources.

Indirectly, this also provides a form of resiliency, not only to failures, but also to improved utilization economies. Using the dynamic reconfiguration mechanism described herein, expanding and shrinking workloads may be cost-effectively, easily and automatically accommodated. For example, excess resources can be used by other SDSs until needed, and power requirements of the SDS 400 can be adjusted proportional to the needs of the workload.

The ability to dynamically reconfigure a SDS 400 without downtime due to failures allows for fail-in place and further allows, for example, the scheduling of repairs. The dynamic reconfiguration mechanism described herein thus has an additional benefit for resiliency. Physical devices may be taken out of service for repair, replacement, or upgrades, while the SDS 400 and its guest OS 404 continue to run. Replaceable devices may be removed from the SDS 400 with disrupting it. Moreover, physical devices may remain in place for an arbitrary period until a removal for replacement or upgrade can be scheduled. Such flexibility is an improvement to existing data center environments, where the techniques described herein both reduce downtime by allowing the system to continue running, while at the same time allowing the appropriate repairs to be done properly, without, for example, the need for "emergency on-call specialists."

Further details regarding handling of hardware faults while allowing the SDS 400 and its guest OS 404 to continue to run are described below.

As used herein, a "component" refers to any hardware portion of the SDS 400, such as a chip, a board, a housing, a cable, etc. In contrast, as used herein, a "module" refers to a combination or collection of one or more physical components that are combined to create or provide an abstract function of the SDS 400 or hyper-kernel. One property of the SDS 400 module is that the module's hardware function may be understood without understanding the details of its constructions, and that its operational state may be described efficiently.

In accordance with example implementations, resilient commodity hardware components with fault-tolerance are used in the SDS 400 (and to create modules), such as error-correcting code (ECC) memory, processor over-temperature slowdown, software redundant array of independent disks (RAID), multipath storage over fabric, bonded networks, etc.

Examples of types of modules in a SDS 400 are described in further detail below. In various embodiments, modules include: a node (e.g., one or more processor chips, a motherboard, its power supply, and a number of memory DIMMs (dual in-line memory modules), etc.), the interconnect network (e.g., the switches, cables, and NICs (network interface controllers) that provide inter-node connectivity), and an addressable guest network interface (e.g., one port on a hardware NIC).

As used herein, a resilient logical module (also called a "resilient module" or a "module" herein) fails gracefully (e.g., degrades rather than fails). Resilient modules include devices that fail into a degraded state. While suffering reduced performance, resilient modules continue to function, such that there is no data loss. However, a failure while in a degraded state may be catastrophic. Degraded components are those that need replacement in a timely manner to maintain system resiliency. Examples of such components include commoditized ECC memory, RAID1/5 volumes, bonded NICs, redundant power supplies, etc.

In accordance with example implementations, a resilient module in a SDS 400 is a logical assembly of one or more hardware components that may be described as having one of five operation states: available, operational, degraded, failing and broken. An available module is a module that is ready for use in a SDS 400, but is not actually in use. An operational module is a module that is connected to the SDS 400 and is being used by the hyper-kernel. An operational module is functioning correctly with full performance.

A degraded module is a module that is connected to the SDS 400, and is being used by the hyper-kernel. Although it functions correctly, its performance may be substandard, and should be replaced in a timely manner, or it will enter the failed operational state. A failed module is a module that is connected to the SDS 400 and causes the hyper-kernel to fail. A failed module does not function correctly.

A broken module is a module that is not connected to the SDS 400. If a broken module were connected to the SDS 400, it would cause the hyper-kernel to fail. A broken module does not function correctly. A SDS 400 whose connected modules are each operational or degraded is functioning. A SDS 400 with any modules that are failing is not working. Available and broken modules are not connected to the SDS 400, and have no effect on system availability.

Logical modules are designed to fail gracefully. Using resilient physical components such as error-correcting memory, CPU modules that reduce their clock speed when overheating, software RAID, redundant switches, bonded network ports, etc., as described above, the majority of failures (e.g., 99.9%) will be those that fail gracefully and degrade, and result in transitions from the operational to the degraded state. That is, the most common data center failures may be made into resilient modules (e.g., power supplies, network connections (connectors, NICs), disk drives, ECC memory, etc.). Failure of a redundant component leads to degraded module operation, but the system stays up, needing repair. Those failures that cause transitions from the degraded state to the failing state will then be to cover second failures. In contrast, only a small number of failures (e.g., 0.01% of failures) will be those that directly transition a logical module from the operational state to the failing state.

Available modules may be added to or detached from the SDS 400.

Broken modules may be detached from the SDS 400 or repaired in place (e.g., reseating a network cable). Broken modules should not be added to an SDS 400.

As used herein, reconfiguration of the SDS 400 refers to a process of binding and unbinding logical modules to physical components, and virtual machine components to logical modules. The distinction between logical modules and physical components is a form of virtualization (albeit, a type of virtualization different from the virtualization of processors, memory, and I/O devices to create a virtual machine that is performed by the hyper-kernel). In accordance with example implementations, enhancing the hyper-kernel by adding the capability of dynamic reconfiguration involves creating a separation that allows for the substitution of hardware components upon which the hyper-kernel operates. For example, the hyper-kernel is divided into two layers. One layer includes logical modules (described in further detail below), which manage certain physical resources in the SDS 400. The second layer is referred to as an "upper layer" of the hyper-kernel that works with any logical modules on any node.

In an example implementation, the logical modules, representing hardware components or other clumps of hardware resources/components in the hyper-kernel, are implemented as data tables. As will be described in further detail below, one example of a logical module is one that represents a physical disk drive. The corresponding data table describes, for example, where the disk drive is in the SDS 400, what transactions are outstanding to the disk drive, etc. Thus, the logical module includes the metadata about the physical components maintained by the hyper-kernel. As the logical module is not hardware, the logical module may be migrated. That is, a logical module implementation is free to migrate its use of physical components, and physical components may be moved transparently. The migration of logical modules may be performed without the knowledge of the guest OS 404. That is, this layer of logical modules is hidden from the guest OS 404.

Thus, in the dynamic reconfiguration framework described herein, the hyper-kernel runs on an assembly of logical modules that are bound at any particular time to physical components. In turn, the hyper-kernel provides a set of virtual resources forming a virtual machine to the guest system, also by binding and unbinding virtual resources to logical modules. The dynamic reconfiguration layer described herein includes a layer, the logical module, that cuts across the architecture of the hyper-kernel.

There is a split between logical modules and virtualized objects. The hyper-kernel includes an internal layering of resilient logical modules that degrade rather than break. This allows for the dynamic reconfiguration of a SDS 400 while the guest OS 404 continues to run, as well as the thin provisioning of physical resources. The dynamic reconfiguration technique described herein also provides a solution to two aspects of resilience, in that the system may continue to run despite failures of hardware components in resilient modules, and there is no downtime for scale changes or preventative maintenance.

In accordance with example implementations, hardware components (of which there may be a wide variety that serve similar functions) may be abstracted into a number of logical module types: node, time base, net port and storage volume.

In accordance with example implementations, a node logical module (also referred to as a "logical node" herein) corresponds to a hyper-kernel node. Internally, the node logical module has CPUs and memory. A node logical module may also hold other logical components of the other logical module types. Holding represents a higher-level aspect of reconfigurability.

In accordance with example implementations, there is a one time base logical module in an SDS 400. The time base logical module represents the time base of the SDS 400 that is used, for example, to synthesize virtual timestamp-counters and various virtual hardware clocks in the system. In one example implementation of a SDS 400, a time base logical module is the master clock and is logically part of a specific node module.

A bus port logical module represents a high-speed interconnection from a logical node to the other logical nodes that are attached to an Internet switch. In accordance with example implementations, there is one bus port logical module in each operational node logical module.

A net port logical module represents a network interface port. For example, a Virtio network virtual device may be implemented using a netport logical module. A storage volume logical module represents a logical drive controller. For example, a Virtio block virtual device may be implemented using a storage volume logical module.

The relationship between logical modules and physical components in the SDS 400 is not necessarily one-to-one. In accordance with some implementations, drivers are used that translate between operations on the logical module and the physical components. In various implementations, this may involve mapping logical module identifiers to physical component identifiers, but may also involve more complex mappings when multiple physical components are used to create a logical module that is resilient and reconfigurable.

Physical components of a distributed logical module may span multiple nodes. Logical modules may relocate, at any time, the function to span a different set of nodes. In accordance with example implementations, relocation is function-specific. For example, to remove a computer node: network interfaces switch MAC addresses to a NIC port on another computer node; local drive array spanning nodes in RAID5 structure simply drop a drive on a computer node and add an empty driver on another; and with respect to the time base logical module, the primary moves itself to another computer node, and drops the current computer node. The guest OS 404 is unaware of the relocation. The relocation process introduces no disruption in function.

In accordance with example implementations, the logical module interface in the dynamic reconfiguration framework described herein is defined by a set of commands that are issued by the hyper-kernel that is using the logical module. Commands may perform their job/task either immediately or asynchronously. In accordance with example implementations, completion of each asynchronous command is signaled through a completion queue. As one example, each completion is delivered as a kernel event (also referred to herein as a "kevent") on a kernel queue (also referred to herein as a "kqueue") specified in the command parameters when the command is issued. Other types of completion queues may be implemented.

In accordance with example implementations, each logical module in a SDS 400 has a unique identifier, also referred to herein as its "logical module ID" (LMI). The scope of LMIs is global to the SDS 400, during the lifetime of the SDS 400 as an entity. The node logical modules have their own LMI, which is a node identifier used in the hyper-kernel. As one example, the node identifier is used in the upper half of the hyper-kernel. In one example implementation, LMIs are represented as 12-bit unsigned integers (allowing for 4096 logical modules in an SDS 400) and may be stored wherever node identifiers are stored (for example in data structures used for resource tracking of pages). The LMIs may be as large as needed.

Logical modules may be relocated infrequently, for example, only when reconfigurations occur. Commands issued to a logical module on one computer node may need to be transmitted to another computer node. In an example implementation, updates to logical module locations maintain a strictly consistent mapping of logical module locations across all computer nodes (which may be in contrast to the resource tracking used for virtual resources in the hyper-kernel, where the per-node knowledge of the location of virtual resources may be imperfect).

In accordance with example implementations, the dynamic reconfiguration framework is implemented in part by an application programming interface (API) that is used by the hyper-kernel. The API may include commands issued to logical modules as procedure calls. In accordance with example implementations, a dedicated interconnect is used to turn a local procedure call into a remote procedure call. For example, the API for logical volumes includes multi-block commands such as readblox, writeblox, and flush. The API also includes Async, for distributed completion queues. The APIs may be extended for guest memory transfer for block I/O, for example to inject guest page (even if current page at a guest physical address is remote) and to link to guest page (e.g., copy on guest page move).

In accordance with example implementations, a logical module is distributed across several computer nodes (while the computer nodes themselves are not distributed). For example, the logical module's components may span multiple computer nodes at any one time. By instantiating certain types of logical modules on multiple nodes at once, resiliency or performance may be enhanced. During reconfiguration, when a logical module's function is being replaced by new physical components on a new node, the transient state of the logical module is distributed. Since the hyper-kernel continues to run while reconfiguration is happening, the operation of the logical module is managed across multiple nodes during this period. Distributed logical modules also allow for quick computer node removal by abandoning components.

One feature of a distributed logical module involves using internal messages between nodes for internal coordination of the parts of the distributed logical module. Ordinary interconnect messages are addressed from the logical module implementation on one node to the logical module implementation on another node. The logical module implementations do not need to deal with virtual objects, so they need not interact with any of the hyper-kernel threads directly. In an example implementation, they are implemented with remote procedure classes that run in response to messages.

In an example implementation, a logical module command to the local module is a procedure call that returns quickly after doing its work. A command to a module that is not local to a computer node will be sent to one of the computer nodes involved in the module, and will return, for example, when the remote command handler returns. In accordance with example implementations, remote asynchronous commands forward kevents to kqueues specified by the command issued.

In modern hardware systems, certain components are physically embedded in computer nodes. For example, memory, processors, and I/O devices, in particular, are often embedded in computer nodes. Thus, repairing and replacing such components typically involves removing the computer node from the system, even if most of the computer node continues to operate.

Consequently, some node logical module holds each of the non-node logical modules of the system. In this context, "holding" refers to a binding that represents that a logical device is implemented by physical components attached to a node logical module. For example, a physical NIC found in a particular physical node may be configured to implement a logical NetPort module, and the physical node may be implementing a logical node module. In this example case, the logical node holds the logical NetPort module. A virtual network device is then bound to the logical NetPort module.

In accordance with example implementations, a computer node includes logical modules that are used to manage physical processors in the SDS 400. For example, the logical module is implemented as a thread data structure in a host operating system, such as FreeBSD. This allows, for example, a standardized VCPU to be presented to the guest OS 404. The physical processors across the computer nodes of the SDS 400 may be heterogeneous, with different capabilities, not all of which are presented to the guest OS 404. The logical module corresponding to the standardized VCPU includes information defining what capabilities of the physical processor are provided/not provided. Thus, a standardized set of identical VCPUs may be presented to the guest OS 404, even if the hardware CPUs are different (where the virtualized CPU is implemented on the logical module, which in turn is implemented on the physical resource).

As another example, pages of memory in the SDS 400 may also be associated with logical memory modules, where a logical module for a virtual memory page includes information about the pages of virtual memory when it is local on the node, such as its GCPP entry. When a page of virtual memory is migrated, the corresponding logical module is also migrated as well. Treating each page of virtual memory as a logical module may involve no additional overhead, because the SDS 400 architecture uses the same data structures to handle page motion between nodes.

As another example, physical network adapters may be associated with virtual network adapters that are presented to the guest OS 404. For example, there may be two physical network adapters on different computer nodes of the SDS 400. In an example implementation, in the hyper-kernel, there may be a logical network adapter (an example logical I/O adapter) that is implemented by the two different physical network adapters on each of the two computer nodes. While the guest OS 404 is aware of the virtual network adapter (which it believes to be hardware), it is unaware of the logical network adapter. The logical network adapter includes the information to make the two actual physical network adapters work together to behave as a single adapter. For example, this information includes information such as the location of the two physical network adapters, so that the two computer nodes on which the physical network adapters are located are aware of each other. When the virtual network adapter moves, the logical element of the hyper-kernel (logical network adapter) also moves in order to continue to work. Thus, in this example, the guest OS 404, running in the upper-level of the hyper-kernel, is not aware of the logical module. The logical module includes the information about the two physical network adapters (e.g., location information), and makes decisions about which of the physical network adapters is used to implement a request by the guest OS 404 to the virtual network adapter. That is, the internal structure of the logical module includes such information about how to apply instructions to the different physical adapters.

Certain logical modules may be implemented in a distributed fashion, spread across multiple nodes. Such logical modules, referred to herein as "distributed logical modules" are held by all of the nodes involved. As an example, certain storage volume logical modules, such as those that have multipath capability implemented in either hardware or emulated in the dynamic reconfiguration framework/subsystem described herein.

The treatment of modules held across multiple computer nodes generalizes the treatment of modules held by one computer node. In accordance with example implementations, in order to remove a computer node, all modules held by that computer node are made non-operational. For such multi-node modules, this includes changing the module's distributed implementation so that the computer node being removed no longer holds it. The opposite may also be performed, as an operational computer node may be added as a holder of a distributed logical module.

In accordance with some implementations, for purposes of removing a physical node, both the logical node module and all logical modules it holds are removed. In one example implementation, a logical module is removed based on the following criterion being satisfied: the logical module is no longer operational and is thus, unused by the hyper-kernel. Another logical module takes over the functions of the removed module.

The holding relationship is one difference between node logical modules and other types of logical modules, which also affects the ordering of reconfiguration steps. For example, suppose that there is a net port logical module, New, that is available and that meets criteria for taking over from another the net port logical module, Old, that is to be removed. Before the removal of Old, which is in, for example, either an operational or degraded state, the virtual logical binding of the virtual network port is changed from using Old to using New instead, and the status of Old is changed to available. This includes assigning the Media Access Control (MAC) address used by Old to New, then waiting for all operations in progress on Old to complete, while directing new operations to use New. When Old is no longer operating, Old transitions into either an available state or a broken state.

In accordance with example implementations, before removing a node logical module from the SDS 400, the node logical module should no longer contain any guest state. In particular, guest pages and VCPUs should not be active on the node logical module. The process of removing guest pages, VCPUs, and I/O devices is referred to herein as "evacuation." In the hyper-kernel architecture described herein, evacuation includes the hyper-kernel mobilizing VCPUs, pages, and I/O, using, for example, the resource migration mechanisms described above.

An issue in evacuation is the handling of guest pages that are "wired" to a node logical module. In some existing systems, certain guest pages may be permanently mapped, for example, to user space pages, for unbounded periods of time. As another example, certain pages may be wired into memory, where such pages would have to be moved from one memory module to another. In accordance with example implementations, the hyper-kernel makes all virtual pages mobile among the node logical modules (i.e., no "wired" pages), such that the virtual pages may be moved at any time. In an example implementation, the SDS 400 does not map guest pages to user space, and I/O device emulations deal with pages that move by stalling on access to a non-local page, then either requesting the page be moved to the node logical module where the emulation is running, or else moving the I/O device emulation thread to the node logical module containing the virtual page.

Therefore, the dynamic reconfiguration layer described herein is supported in part by guest pages not being "wired" to a particular node logical module. This allows, in accordance with example implementation, for evacuation of pages from a node logical module to be possible at all times. As a note, transfers of data into or out of a guest page do not "wire" the page. In accordance with some implementations, transfers, whether by a VCPU or I/O emulation, are performed as a unit operation that holds the guest page in memory only long enough to complete the transfer. In accordance with example implementations, two mechanisms avoid many I/O related data copies: replacing a guest virtual page with a page of non-guest memory, and creating a "copy-on-write" clone of a guest virtual page. Otherwise, I/O emulations break up their transfers into chunks within pages, and perform the transfers to/from each virtual page, one at a time.

VCPUs may migrate to a different logical node whenever they stall. To evacuate any VCPUs that happen to be on a node, a stall is invoked, and upon that stall, a migration of the VCPU takes the VCPU off of the node. Similarly, virtual pages may be removed at any time to another node, by an operation that moves the owner of the page. For pages that are secondary copies (e.g., of read only pages), these pages may be deleted without transferring the page anywhere.

In accordance with example implementations, the evacuation of all virtual pages is performed by looping over all pages in the logical node, and sending each guest virtual page to another operational logical node in the SDS 400. Similarly, in an example implementation, evacuating of all VCPUs is performed by looping over all VCPUs in the logical node, triggering stalls that force each VCPU to move to another operational logical node.

Two example issues to be dealt with during evacuation while the SDS 400 is operating are: resource tracking and migration blocking. Regarding the resource tracking issues, in accordance with example implementations, all virtual resources (e.g., VCPUs, virtual pages, and virtual I/O devices) are tracked by a distributed resource-tracking algorithm that keeps track, on each logical node, of where the resource was last sent. In an example implementation, tracking data includes a chain of node pointers that are followed to find a resource that is not on the current logical node. When a resource is moved during evacuation, other logical nodes in the system may still be operating under the assumption that the resource is on the evacuated logical node. Consequently, the evacuated logical node may receive requests for those resources that have moved. Typically, these messages would be forwarded to the logical node to which the resource has been moved, but this may not be possible once the evacuated logical node becomes non-operational.

Regarding the migration blocking issue, in accordance with example implementations, in order to complete or finish evacuating a logical node, resources should not move to that logical node. Consequently, other logical nodes should be notified to not send resources to the evacuating node.

The above two example issues are addressed using the following example evacuation process, which proceeds in multiple steps. First, the evacuated logical node informs all logical nodes that it is no longer a destination for migration of VCPUs, guest virtual pages, or virtual I/O devices. The evacuated logical node may still receive requests for resources, which the local node (or hyper-kernel on the evacuated node) handles or forwards as appropriate during the evacuation phase. Next, the evacuated logical node then begins evacuating pages, VCPUs, and virtual I/O devices that are present.

Each evacuated resource generates a special location update message, which is broadcast to all other logical nodes by the evacuated logical node, indicating that a resource has moved from the evacuated logical node to the new logical node (i.e., a message that notifies other nodes of the updated location of the resource). In accordance with example implementations, evacuation location updates are bundled into messages (e.g., of medium size, or any other size, as appropriate) on the interconnect, reducing the overhead on the interconnect (e.g., to a small ~16 bytes/resource).

Upon receiving an evacuation location update for a resource R moved to logical node N from evacuated logical node E, a logical node checks where the node believes R is, and if it is E, then the logical node accepts N as its new location for the resource R. When the evacuation of logical node E is complete, node E broadcasts an evacuation complete message (indicating completion of the evacuation of resources) and waits for response from all other nodes (acknowledging receipt of the evacuation completion message).

When a logical node receives an evacuation complete message from logical node E, the receiving logical node scans its own local tables to verify that no resource is now thought to be on logical node E and if that is true, responds with an evacuation OK message. If not, then the receiving logical node sends one or more evacuated location request(s) for locations of all resources still thought to be on logical node E.

When logical node E receives evacuation OK messages from all logical nodes, logical node E moves out of the operational state. While waiting for the evacuation OK messages, logical node E handles evacuation location request(s) responding with evacuation location update messages.

I/O mobilization supports the ability to allow a virtual I/O device to be re-bound to a different logical module on a different logical node. There are two bindings that are involved: virtual-to-logical, and logical-to-physical. A virtual I/O device is mobile, as the virtual I/O device may be accessed from any VCPU, and the virtual I/O device may access any virtual page without having to move the logical module or physical devices used in its implementation. Consequently, in accordance with example implementations, the evacuation process handles the virtual I/O devices, whereas the logical device bindings are handled by the logical module binding's move from one physical node's components to another.

Storage devices come in many varieties. Locally attached drives, removable drives, network attached storage, and fabric attached storage are but some examples of the various options that may be used. In the SDS 400, such storage devices are represented by a single type of (possibly distributed) logical module, the storage volume logical module (also referred to as a "logical storage volume" herein). In particular, in accordance with example implementations, the hyper-kernel virtualizes block devices (e.g., whether using Virtio or emulating Peripheral component Interconnect Express (PCIe) hardware interfaces) using a common internal storage volume API, which provides, for example, queued asynchronous I/O requests within a logical node (and which may be optimized, for example, for handling virtual 4K page-sized and page-aligned blocks). As a note, some operating systems such as Linux, FreeBSD, and Windows are designed to attempt to use page granularity on their disk file systems wherever possible, and keep page-aligned storage caches wherever possible. While they can support different disk block sizes in their file system code, they typically use their virtual memory layer to manage their disk caching, so their unified disk caches only cache page sized, page-aligned blocks.

In accordance with example implementations, the higher-level hyper-kernel emulates block devices using the common storage volume interface. For example, in accordance with example implementations, the hyper-kernel implements emulations of Virtio-block Advanced Host Controller Interface (AHCI)/AT Attachment Packet Interface (ATAPI), as well as NVME Express (NVMe) virtual devices. As a note, NVMe, though defined for hardware implementation, has benefits as a guest interface for storage virtualization as compared to the Virtio-block interface, because it uses natural 4K page-sized transfer, and supports more efficient queueing protocols. In some implementations, such emulations (run, for example, on virtual I/O processors, also referred to herein as "VIOPs") acquire command chains containing descriptors from queues in guest virtual memory, and translate those commands into block level commands to logical storage volumes. The virtual block device emulation code does not need to know how the storage volume effective "drivers" implement devices, and the storage volume drivers do not need to have knowledge about guest virtual memory, interrupt signaling, etc. This separation of concerns provides reconfiguration flexibility.

A logical storage volume may be distributed among multiple logical nodes (i.e., a distributed logical module), and therefore any or all of the logical nodes may be involved in a particular block-level command. For example, a logical storage volume may be implemented using multiple disk drives across several nodes, where the drives are mirrored using Redundant Array of Independent Disks (RAID), or striped to allow parallelized transfers to/from different logical nodes. In accordance with example implementations, the logical storage volume driver code is configured to route block-level commands to the right disk drive(s) on the correct node.

In accordance with example implementations, all virtual storage volumes may be configured to have 4K block size. Zero copy of virtual-logical data transfers may be performed by mapping. Logical volumes are independent of physical volumes, where RAID/multipath redundancy is managed by the hyper-kernel.

As a second example, a fabric-attached logical storage volume supporting multipath access may be connected to several logical nodes, again presented to the hyper-kernel as a distributed logical storage volume across some or all of those logical nodes (or only to a single one of the logical nodes). In this example case, block-level commands issued to the distributed logical storage volume may be directed to any one of the elements of the distributed storage volume.

A reconfiguration may temporarily put a logical storage volume in a distributed state, as the paths to content and contents themselves are transferred among logical nodes.

In accordance with example implementations, the interface to the logical storage volume deals with page-sized blocks. For writing to the Logical storage volume, one or more blocks are provided to the logical storage volume, the transfer is done, and the block is released back to the system.

For reading from the logical storage volume, one or more blocks are provided to the logical storage volume, the transfer is done, and the block is released back to the system with the contents updated. Transfer completions are signaled on a completion queue, along with a status block indicating the transfer's success/failure. In one example implementation, the completion queues use the kernel event mechanism (kqueue) in the operating system FreeBSD. In accordance with example implementations, a flush command is provided that allows forcing of one or more blocks into stable storage. The same interface may be used even when the transfer is smaller than a block, where, for example, only a portion of a page-sized block is read or written in the physical device.

The use of page-sized and page-aligned blocks results in the most common case of I/O involving only re-binding of the current instance of a virtual memory page. This is more efficient than copying data multiple times. In most cases, I/O may be done with zero memory-to-memory copies. Reading data from a drive into a block creates a new memory page on the node containing the device. Once the read is complete, the memory page is substituted in the guest virtual memory for the page that is the guest's I/O target. During I/O, the old page still takes up space in memory. However, once the I/O operation begins, the page will ultimately be erased. Thus, as soon as the I/O operation is queued, the hyper-kernel may erase the page. If the target of the I/O is, in actuality, on another node, this is not consequential. While the page read is in progress, the target page may be erased and a dormant instance moved to the node performing the I/O. In accordance with example implementations, pages in the system that have not yet been zeroed are indicated as "dormant" pages. In accordance with example implementations, these dormant pages are zeroed on an ongoing basis or are not zeroed until the first time that they are used (e.g., allocated and written into or created). When the page read is complete, the new contents are in a page that may be substituted for the dormant page. If the dormant page moves off of the node in the interim (which may be unlikely as it will not typically be accessed), the new contents of the page may be sent to wherever the page has moved.

Writing data from a block to a drive is similarly optimizable. In an example implementation, the page to be written should be on the node of the logical storage volume driver (if distributed, the page may be moved to whatever node can most efficiently perform the write). If not already there, a copy may be used. The page may become designated as a PRIMARY page, moved to the device as a SECONDARY copy of the page, leaving the PRIMARY page where it is (where PRIMARY and SECONDARY are examples of states that a page or copy of pages may be in). This creates a "copy-on-write" situation for the guest page during the time the write of the block is in progress. The virtual page instance being used by the logical storage volume may be moved or deleted, but the instance will retain its contents, and is not freed until the write operation is complete. In an example implementation, this feature is implemented by adding a flag to each page in memory marking the page as in-use by a logical storage volume write.

Logical storage volumes contain large amounts of guest data that must be preserved, and will continue to be accessed during dynamic reconfiguration. Thus, when a logical node is removed, the data in any logical storage volumes held by the node should be preserved. Different preservation processes may be used depending on how the logical storage volume is implemented in physical media. However, in all cases, the same command to the logical storage volume may be used to accomplish the preservation, where this command to the logical storage volume is referred to herein as logical storage volume relocation.

In accordance with example implementations, a logical storage volume is relocated from one set of nodes containing devices to a new set of nodes containing the same or other devices. The command issued to the Logical storage volume (which is aware of how and on which nodes it is currently implemented) specifies the target set of nodes to be used (which may overlap with the current set of nodes used), and any new devices on those nodes that may be used. The Logical storage volume driver is configured to carry out the steps to implement the relocation. During relocation, the logical storage volume expands to include the source set of nodes and the target set of nodes, then shrinks or contracts to include only the target set of nodes. This expansion/contraction approach allows the APIs to the logical storage volume to hide information regarding the internal implementation of logical storage volume drivers from the rest of the hyper-kernel.

For a multipath-capable fabric-connected storage, relocation includes updating the set of nodes from which the remote storage device may be accessed, and initializing any new connections in the relocation target set, while shutting down any connections on the nodes being dropped from the relocation set. Since the contents are remote, there is no transfer of contents.

As another, more complex example, a single volume that involves one or more locally attached drives on a single computer node may be relocated. One example approach involves transferring the contents by moving the physical drives themselves from slots on one computer node to slots on another computer node. In this approach, there may be a short time (which may be on the order of several seconds) during which the drive will be inaccessible to the guest. Further, a human operator may be needed to manually move the physical drives, which if done incorrectly, may cause the system to crash. Other approaches that improve system availability are described below.

As another approach, suppose that there are spare, empty locally attached drives on other computer nodes (e.g., on the replacement node taking over from the node that is failing), or a remote fabric-attached backup storage device. A relocation may be performed by copying the contents from one volume to another. Assuming the computer node being removed is continuing to run adequately, such a migration may be performed, but may take time. The logical volume becomes temporarily distributed across two logical nodes and internally manages the commands to be redirected to the device containing the current copies of blocks as they are copied.

As yet another example, a more complex form of local storage may avoid having to keep a degraded node running for a long time while its logical storage volumes are copied off. In an example implementation, this example form involves using RAID-style distribution of parts or portions of a RAID volume across multiple computer nodes. For example, a logical storage volume may be implemented as a RAID5 array across four computer nodes, each containing one drive. Each pair of logical blocks would be represented as three physical blocks on three successive drives, where two of the physical blocks are the logical blocks' contents, and one of the physical blocks is the parity block, which contains the bitwise exclusive-or of the logical blocks' contents. If it is detected that one of the four drives fails, then the logical storage volume transitions to the degraded state. However, the physical contents of that drive may be reconstructed by combinations of bits from the physical blocks on the other three drives. Thus, a single drive failure may be handled by adding a new, empty drive on any node to the RAID distributed volume—this is an example of a relocation operation. However, if one of the nodes degrades in some other way, the drive on that node may be reconstructed in the same way without requiring the drive on the degraded node at all.

Thus, one beneficial result of locally distributed Logical storage volumes using RAID5 style structures is that nodes may be replaced quickly, leaving the reconstruction of Logical storage volume contents on that node to be done at leisure after the reconfiguration is complete.

One potential cost of using a distributed Logical storage volume of RAID5 style across multiple computer nodes is that writes to the Logical storage volume may be slower, as any write involves an update to both the logical block and to the parity block. Instead of one write, this requires an extra write, and possibly a read of the other logical block covered by the parity block, if it is not in memory. By distributing the physical devices across computer nodes, at least one block's worth of data may also have to be transferred between nodes, as well. However, the RAID structure also has performance advantage, where, for example, it allows high-speed loading of data into memory, because of the doubling of bandwidth from physical storage into memory Block I/O is accomplished through a common API internal to the hyper-kernel that communicates to the logical storage volume abstraction, implemented by a logical storage volume driver. In accordance with example implementations, logical storage volume drivers are implemented on multiple nodes, as distributed logical modules. Distributed logical modules may be relocated so that one or more nodes no longer hold the logical storage volume. Such relocation is one way to replace a node holding a logical storage volume.

The logical storage volume is designed in such a way as to hide many details of common storage systems from the guest virtual machine supported by the hyper-kernel distributed virtual machine manager, which instead is presented and sees simple block drives. In accordance with example implementations, the details of storage devices, connectivity, etc. may be reflected through to the guest OS 404, which may then handle these details on its own, even through the mappings provided by inverse virtualization across nodes. However, it may be more beneficial to apply the modularity achieved by inverse virtualization to hide complexity from the guest OS 404, while at the same time allowing better performance and higher resiliency.

The logical storage volume abstraction described above creates a strict separation between how virtual block devices obtain their instructions from the guest OS 404, and how those instructions are mapped to commands issued on physical devices.

In accordance with example implementations, another category of I/O devices (in addition to the block devices described above) is network interfaces. In contrast to logical storage volumes, network interfaces need not manage "contents." Substituting one physical NIC port for another may be performed. For example, the MAC address, one aspect of a NIC port that uniquely identifies the NIC port, may be reassigned quickly (e.g., in milliseconds).

The SDS 400 splits the emulation of a guest network interface port (e.g., implemented using Virtio-Net, or any other standard, as appropriate), into two parts—the guest facing upper half, and net port logical modules (also called "logical net ports") that handle all of the issues of dealing with the physical hardware.

In contrast to block devices, where guest operating systems typically perform I/O using page granular, page-aligned buffers, existing operating system networks are typically not well organized for zero-copy transfers organized around page-sized units. As one example, the structure of I/O operations to net ports is as follows. Commands are issued to the net port logical module, either synchronously or asynchronously, to read a packet or write a packet to the physical device currently being used by the net port to implement the logical network port. In accordance with example implementations, when a packet is being sent, it is copied out of guest virtual memory to a list of real local memory blocks by the hyper-kernel, and this copy is provided to the net port logical module. In some cases, the copy will be to an mbuf (an example of a memory buffer) on the node where the page resides, with the mbuf being provided to the logical module. This simplifies the sending from/through a local device or a remote device, as mbufs are used in the hyper-kernel for both.

The net port logical module may transfer the copy across the dedicated network interconnect from where the copy was made to the physical device's node. This copy may be smaller than a page, and avoids the need to copy a large amount of other data in the page to the device, resulting in a reduction in interconnect traffic. Upon completion, the status is put in a completion queue.

In accordance with example implementations, packets being received are placed in local memory buffers, which are returned in a completion queue, using, for example, the command/completion queue interface described above. In accordance with example implementations, the memory buffers are provided to device emulation code, which copies them into guest virtual memory. Again, in accordance with example implementations, an mbuf chain is used as the form of data returned upon completion of a packet receive. The mbuf chain may then be copied into the virtual pages a chunk at a time, and if the pages are remote, the mbuf chain may be transferred over another interconnect that is configured to handle mbufs as part of its packets.

In accordance with example implementations, initialization of a computer node places the corresponding logical node module in the available state. A shutdown of a computer node may be performed after the corresponding logical node module is in either the available or the broken operational state. Details regarding removal of a node have been described herein, which places the logical node into the available or broken operational state. In the available and broken states, the hyper-kernel and logical modules are still functional, their data structures that track logical modules and memory state are initialized, etc. These states may have similarities. One example of a distinction between available and broken is that a computer node affiliated with the broken state undergoes repair before the computer node is added back to a SDS 400, whereas a computer node affiliated with the available state is ready for use.

In accordance with example implementations, an computer node affiliated with the available state is powered up and ready to be added to a SDS 400. In accordance with example implementations, the initialization of a computer node occurs before the computer node is affiliated with the available state.

The shutdown of a computer node may, in accordance with example implementations, include various steps, where for example, some state may need to be saved before powering the node off (i.e., state preservation may be performed during shutdown). In accordance with example implementations, in order to implement the dynamic reconfiguration framework described herein, the initialization of the hyper-kernel is structured into two steps, with a third step that starts the SDS 400. In accordance with example implementations, each logical node is initialized separately, bringing the node to the available operational state. In accordance with example implementations, this initialization does not involve interaction among the logical nodes, as the node initializations may occur in parallel. In an example implementation, the recipe or process for initializing each logical node is communicated to the logical node in textual form.

The initialization of the hyper-kernel may next include applying SDS-specific parameters to one or more logical nodes, putting them into operational states. In accordance with some implementations, two types of descriptions are included at this point: SDS-wide parameters (e.g., guest address space size, number of VCPUs, etc.), and a definition of the logical modules that are to be held on each logical node, initially.

The initialization of the hyper-kernel may next include selecting a single logical node as the "boot node" and providing bootstrap information, which starts the SDS 400. In accordance with example implementations, all VCPUs and non-dormant memory are initialized on the boot node.

However, after such initialization, there is no distinction or difference between the boot node and other logical nodes. For example, the boot node may not even be logical node 0. One characteristic of the boot node is that the VCPUs are initially found on that node.

In accordance with example implementations, any computer node may be removed (e.g., either to scale down needed resources or to perform replacement due to failure). This includes the computer node associated with the boot node, which as described herein, after initialization, is no longer differentiated from other logical nodes.

In accordance with example implementations, the SDS 400 may be administered from an administrative node, such as administrative node 499 of FIG. 4. The administrative node may issue service commands relating to node actions during startup, reconfiguration, removal, etc. In accordance with some implementations, the administrative node may not be used to maintain operation of the SDS 400, thereby preventing the administrative node from becoming a single point of failure that will cause the SDS 400 to fail. The administrative node may provide monitoring/management capabilities to manage physical components in the SDS 400. For example, the administrative node may perform external monitoring of physical component health and allows for manual or automatic failure response. In accordance with example implementations, the nodes of the SDS 400 maintain configuration and health information used by the administrative node in case the management service fails. In an example implementation, the SDS 400 provides ports on each node (which may also be replicated) that may be used to administer each node by any (authorized) node that provides the administration server. These ports provide a path for logging data about operations, collecting system health information, or other information. In accordance with example implementations, these ports also support a protocol that allows for querying the current system configuration status. Rather than keeping system configuration in an external structure, which could be inconsistent or unreliable, the dynamic reconfiguration layer on each node provides introspection capabilities such that a new administrative may discover the information needed to administer the SDS 400, should the first administrative node.

The functionality of the introspection interfaces provides the ability to inventory all logical modules currently operating in the SDS 400, all nodes whether operational or not, and the physical devices in each node, along with their usage by logical modules. This is also a point of coordination with an administration console. In an example implementation, the administration console for the SDS 400 is a program running outside the hyperkernel that controls the dynamic configuration changes by using the introspection interfaces. In accordance with example implementations, the administration console is implemented within a separate computer connected to the SDS 400, or on one of the hardware nodes of the system as a process that runs concurrently with the hypervisor. If it is implemented on one of the SDS's nodes, then it is stopped and restarted on another computer if the node is to be removed from the server.

In accordance with example implementations, the time base logical module (also called the "time base module" herein) is responsible for ensuring the invariants related to guest virtual time across all nodes of the SDS 400. The design invariants of time sources and time event sources in the hyper-kernel are twofold: virtual time does not "go backwards" from the guest operating system's point of view; and the virtual time maintains a constant rate relative to external wall clock time, as seen through all virtual time sources and time event sources. The invariant rule regarding "going backwards" may be complex, as there is a causal ordering between time as read from virtual clock devices and guest virtual memory contents. For example, if two VCPUs read the same clock, the ordering of memory operations they carry out before and after the clock readings should conform to a causal serialization of the memory accesses carried out by the VCPUs. Causal ordering is assumed for correctness in many guest synchronization techniques that use, for example, the time stamp counter (TSC) of the Intel instruction set along with memory access ordering constraints.

In accordance with example implementations, these invariants are achieved in the SDS 400 by using a single distributed very high-resolution clock that is effectively synchronized among every pair of logical nodes (e.g., with less than microsecond disparity among every pair of nodes), and a rule that effectively delays each guest-level transfer information between nodes such that such a transfer never arrives at a local time earlier than it was sent. If the interconnect has a transfer latency greater than the disparity between the pairs of logical nodes, then there may be no need to delay at all, unless the time synchronization allows time to diverge. This may be achieved by controlling the effective rate of the virtual clock so that each node's virtual clock has an identical rate on an order of, for example, parts per-million.

With respect to the time base logical module and dynamic reconfiguration, maintenance of synchrony and rate are also taken into account during adding or removing of a logical node. For example, a new logical node is synchronized to the existing logical node when the new logical node becomes operational.

In accordance with example implementations, the interconnect among the computer nodes of the SDS 400 is made resilient by increasing redundancy. In accordance with example implementations, the dynamic reconfiguration framework achieves this by using multiple ports on each computer node and multiple switches, such that the failure of a switch or a cable merely degrades performance, but an alternate (redundant) delivery path exists.

In an example implementation, the hyper-kernel assumes in-order message delivery, and the interconnect protocol manages the choice of paths to a particular node destination internally to the bus port logical module, which corresponds, for example, to the network kernel implementation of the hyper-kernel. In accordance with example implementations, selection of paths and detection of failed paths are performed in the network kernel driver. Thus, multiple network ports on a computer node are represented at the reconfiguration framework API by a single bus port logical module.

Future growth of the SDS 400, such as the expansion of a thinly-provisioned SDS 400, may involve the addition of more computer nodes than were originally part of the SDS 400 at start up. The implication of this is that the set of logical nodes actually in use may vary over time. In an example implementation, in order to handle multiple switches, multiple ports, etc., the interconnect protocol is configured so that it separates logical node identifiers from physical layer constraints. When broadcasting hyper-kernel messages, logical nodes that are not operational need not receive or handle such hyper-kernel broadcasts, as this may introduce failures if they do. In accordance with example implementations, hyper-kernel broadcast is implemented such that there is a "multicast group" that is maintained for all logical nodes that are operational, and that the hyper-kernel broadcast operations use this multicast group, rather than a total broadcast (which may result in broadcast to non-operational logical nodes as well).

In accordance with example implementations, unicast messages may be sent to a logical node, whether operational or not. This capability may be used for messages used for purposes of managing a reconfiguration of the SDS 400 (e.g., messages communicated for purposes of adding another computer node and the corresponding logical node to the SDS 400). In accordance with example implementations, reconfiguration also uses broadcast to all nodes on a segment—this may be used for administration functions to determine the state of all nodes, not only the operational nodes, while the system is running.

In accordance with example implementations, a dynamic reconfiguration framework for the SDS 400 divides the hyper-kernel into two layers, one dealing with implementation of a single scalable virtual hardware system (e.g., single scalable virtual hardware system), and a lower layer that provides abstractions of logical Modules used to implement all of the functions used to allow for dynamic reconfiguration while the SDS 400 continues to run. The logical modules may encapsulate mechanisms of fault tolerance by supporting operation of a particular logical module in a "degraded" state when a hardware component associated with the logical module fails.

In accordance with example implementations, an external management system, (e.g., implemented in a console of an administrative node) ss configured to detect/monitor for the signals that indicate hardware component failures. The signals may be provided by the various per-node hyper-kernels. Each hyper-kernel may listen for failure-identifying signals, for example, by polling physical components and/or obtaining reported values from physical components.

The hyper-kernel may detect failures in components by accessing status information collected by a server motherboard. For example, the server motherboard may collect and/or report the performance of various hardware components attached to the motherboard (e.g., the memory chip, processor, fans, block devices, network devices, etc.). This may include telemetry data, such as temperatures, voltages, fan speeds, errors detected and corrected, etc., which are collected, for example, in memory registers that, while not seen by the guest OS 404, are accessible by the hyper-kernel. In accordance with example implementations, a per-node hyper-kernel is configured to poll the node's motherboard for such telemetry information. In other embodiments, the motherboard reports such telemetry information to the hyper-kernel. The hyper-kernel may then pass the telemetry information to the external management system (where the hyper-kernel may also perform processing on the telemetry information (e.g., summarizing, such as determining counts of events, rates of events, etc.) before it is passed to the external management system).

The hardware may periodically (e.g., based on a timer interrupt) reports the state of the hardware, which may be read by the hyper-kernel. For example, there may be various registers throughout the system, such as on motherboards and processors, that indicate what faults have occurred. The fault may be a fault that does not change the behavior of the processor. As one example, consider a memory fault that is detected. The detected memory fault may be recorded and stored in a register of the motherboard. In existing systems, such telemetry information that is collected on motherboards is typically not reported anywhere off of the basic register that captures the telemetry information. In an example implementation, the hyper-kernel makes use of such information to identify failing/degrading hardware devices/components.

In an example implementation, the hyper-kernel observes the count of correctable memory errors. For example, a bank of memory may use the count to determine the rate of correctable errors on any time scale as appropriate (e.g., correctable errors per minute, per hour, etc.). In a typical computing system, the rate of correctable errors that are detected may be on the order of zero per hour or zero per week. As the system ages however, the rate of correctable errors may increase, for example, to one or two correctable errors per month. While the memory may not be completely unusable (i.e., the memory is in a degraded state) and need not be removed entirely, such information may be used by the hyper-kernel to initiate remediation actions to address the degraded component before it fails.

In general, a running SDS 400 may be dynamically reconfigured based on a computer node lifetime-based ranking for any of a number of different reconfiguration operations, according to various implementations. For example, a dynamic reconfiguration may be part of a preventative maintenance program in which one or multiple active computer nodes of the SDS 400 are selected, or identified, based on the ranking (e.g., the active computer node(s) having the least expected remaining lifetime(s), as indicated by the ranking) and are removed from the SDS 400 for purposes of performing maintenance (e.g., servicing and performing diagnostic tests) on the removed computer nodes. Moreover, as a further part of this dynamic reconfiguration, one or multiple spare computer nodes are selected, or identified, from a pool of spare computer nodes (e.g., the spare computer node(s) having the most expected remaining lifetime(s), as indicated by the ranking) and are added to the SDS 400. The adding of computer node(s) to the SDS 400 and the removal of computer node(s) from the SDS 400 occur without disrupting the guest operating system or executing applications of the SDS 400.

In general, preventative maintenance programs may be established to improve system reliability. As one example of a preventative maintenance program, swapping of computer nodes may be scheduled on a time driven basis (e.g., one every year or semiannually). This ability to reconfigure the SDS 400 while the SDS 400 continues to run and provide such high availability without any downtime is an improvement to existing data centers, as compared to, for example, taking down the operating system and applications that are running on a distributed system for hours or even days and accounting for additional time to perform the maintenance and restart the system.

As another example of a dynamic reconfiguration, a thinly-provisioned SDS 400 may be dynamically reconfigured to add one or multiple computer nodes to the server based on the ranking (e.g., spare computer node(s) having the greatest expected remaining lifetime(s), according to the ranking) are added to the server, without disrupting the guest operating system or executing applications of the SDS 400. "Thin provisioning" refers to the ability to dynamically and transparently adjust the size of a computing system (such as the SDS 400) depending on the workload demanded from the system. A thinly-provisioned system, in accordance with example implementations that are described herein, is a system that has an apparent allocation of physical resources less than the system's actual allocation of physical resources. Stated, differently, the physical resources of a thinly-provisioned computer system are oversubscribed.

Computers include resources such as processors, memory, and I/O functions such as disk drives and network connections. Applications are run on these computers which utilize these resources. In some cases, the application may require or try to use more processors or memory than are present in the computer. One example of this is an application addressing more random access memory (RAM) than is present in the computer. At this point, pages of memory which are not actively being used are moved from RAM to storage (e.g., hard disk drive HDD or solid-state drive SSD) and saved to make room for other pages of memory that have been saved in the storage media to be retrieved and brought into RAM. This "paging" fools the application into believing that it has more RAM than is actually physically present. Similar mechanisms exist for processors and I/O functions to be virtualized and thus potentially be oversubscribed on the computer (i.e., available hardware). As an example, a virtual processor may be saved and thus idled while another processor is (re-)started utilizing the physical processors which are available. Operating the computer system in this oversubscribed state involve executing instructions which save the processor state, saving that state in memory, and then loading the new processor state which will then be resumed.

As an example, a thinly-provisioned software-defined server may be a secondary, or backup, server of a pair of servers (e.g., a high availability pair of servers or a disaster recovery pair of servers), where the other server of the pair is the primary server. The primary server may serve a primary role (e.g., a database server) and be fully provisioned for this purpose. The secondary server may serve a secondary role that does not require the actual physical resources that are required for the primary role. For example, the primary server may include application logic that processes transactional data with clients and commits data to persistent storage. The secondary server may include logic that synchronizes the server to the data committed to persistent storage. The secondary server may have the same software (e.g., applications and operating system) as the primary server, so that should the primary server fail, the secondary server may take over the primary role and take over the additional functions (e.g., application logic that processes transactional data) that were performed by the now, failed primary server.

The software that is installed on the secondary server may expect the same physical resource allocation as the primary server's physical resource allocation. Allocating this level of physical resources for a standby secondary server may, however, be rather costly, as the full level of physical resources are not being utilized. Another approach may be to thinly provision the secondary server and in response to the primary server failing, power down the secondary server, add the addition resources and then power the secondary server back up to transfer to the primary role. Such an approach, however, may consume a considerable amount of valuable time, which may be quite costly for clients.

Another approach that is available when the secondary server is a thinly-provisioned SDS 400 is to thinly provision the secondary SDS 400. Here, thinly provisioning the SDS 400 refers to the full set of computer nodes of the SDS 400 providing an actual physical resource allocation, which is less than the actual physical allocation required when the SDS 400 serves the primary role. Because of the thin provisioning, the secondary SDS 400 utilizes fewer physical resources (as compared to a secondary server that has the full physical resource allocation). A pool of spare, fully powered up computer nodes is available to allow computer nodes to be added to the secondary SDS 400. Therefore, responsive to the primary server failing, the thinly-provisioned secondary SDS 400 may be rapidly thickened (i.e., the physical resource allocation may be increased) by adding one or multiple spare computer nodes to the server, all without disrupting the server's operating system or executing applications. In accordance with example implementations, the spare node(s) to be added to the secondary SDS 400 are identified based on the ranking (e.g., the spare node(s) having the greatest expected remaining lifetime(s) are selected to be added).

Thickening a secondary server is one example of scaling up the number of computer nodes of an SDS 400. A SDS 400 may be dynamically reconfigured to scale up the server for other reasons, in accordance with example implementations. For example, the rate at which digital data continues to grow, where data centers must handle ever larger amounts of data. Typically, however, it is difficult for customers, when specifying data centers, to determine an appropriate size of their data center. It is also difficult for application developers to understand the size of the compute environment needed for their application, which may change over time. In existing data systems, the application developers may over-specify the amount of resources (e.g., processor cores and/or memory) needed to run the application, where the data centers may make their own determinations on the needed amount of resources in an attempt to keep resource utilization high and control costs.

Rather than being dependent on a specific size of computer resources, an SDS 400, being dynamically scalable, may be scaled up or down over time, depending on the server's workload. This dynamic scalability has a benefit in that when the application is developed, there is no longer a constraint based on the available sizes of computers. In contrast to existing data centers, when a workload is run, it is no longer necessary to undergo a major sizing effort to determine the appropriate size of computer to purchase or deploy in order to run the application. Instead, using the techniques described herein, the SDS 400 may size itself to the workload/application. If more physical resources are needed, then computer nodes may be transparently added out from, for example, a spare pool of unused computer nodes. The process of adding spare node(s) may include identifying the spare computer node(s) to be added based on an expected remaining lifetime ranking, as described herein (e.g., spare computer node(s) having the greatest expected remaining lifetime(s) are selected to be added). When resources of a computer are no longer being used or not needed, one or multiple active computer nodes of the SDS 400 may be transparently withdrawn and returned to the pool. The process of removing computer node(s) from the SDS 400 may include identifying the active computer node(s) based on an expected remaining lifetime ranking (e.g., active computer node(s) having the least remaining expected remaining lifetime(s) are selected for removal). In effect, the amount of resources that a user writing or running an application/job believes to be available does not need to match to the actual amount of physical resources of the SDS 400. When resources are needed, the SDS 400 may scale/grow so that it continues to run optimally. Such adjustments may be performed dynamically with fast response rates, and/or over an extended period of time as the size of a dataset/application grows. Further, the dynamic ability to resize may have additional benefits such as, for example, allowing resources from relatively lower priority jobs or applications to be dynamically and rapidly transferred to relatively higher priority jobs/applications. For this purpose, applications or jobs may be designated with priority labels, such as "mission critical," "best effort," or "as available."

The dynamic upscaling and downscaling of resources for a SDS 400 may be either requested either manually (e.g., by an operator of the system) or automatically (e.g., based on automatic monitoring of the load of the servers in the system).

Referring to FIG. 7, in accordance with example implementations, a non-transitory machine-readable storage medium 700 includes instructions 710. The instructions 710, when executed by a system, cause the system to receive information related to the wear of computer nodes. In accordance with example implementations, the system may be a distributed system, such as a virtualized system or a non-virtualized system. In accordance with example implementations, the virtualized system may be a software-defined server. In accordance with example implementations, the information related to wear may be wear indicators associated with a physical processor of a computer node. As examples, the wear indicator may be a current rate of times that the processor has operated at a reduced frequency. As another example, a wear indicator may be a total number of times that the processor has operated at a reduced frequency. As another example, a wear indicator may be associated with a physical memory. For example, a wear indicator may be a pattern of error corrections applied by the computer node. Other wear indicators may be, as examples, wear indicators related to I/O devices, network devices, network cables and motherboards of the computer nodes. The instructions 710, when executed by the system, cause the system to, based on information related to wear, rank computer nodes according to their respective expected remaining lifetimes. The instructions 710, when executed by the system, cause the system to, responsive to an event that corresponds to at least one of a spare computer node being added to the system or a given computer node being removed from the system, reconfigure the system based on the ranking.

The instructions 710, when executed by the system, cause the system to, based on information related to wear, rank the computer nodes according to their expected remaining lifetimes. In accordance with some implementations, the ranking may be a most life first out (MLFO). The instructions 710, when executed by the system, cause the system to, responsive to an event that corresponds to at least one of a spare computer node being added to the system or a given computer node being removed from the system, reconfigure the system based on the ranking.

The reconfiguration may include identifying a particular computer node based on the ranking. Moreover, the identification may include applying an additional selection criterion (e.g., a random selection criterion, a pseudo-random selection criterion or a node ID selection criterion). For example, the identification may include identifying a list of predetermined number of computer nodes based on the ranking and then randomly or pseudo-randomly selecting one or multiple computer nodes from the list.

In accordance with some implementations, the event corresponds to scaling up the distributed system, and the spare computer node identified, according to the ranking, as having the greatest expected remaining lifetime is selected to be added to the system. In accordance with example implementations, the event corresponds to a downscaling of the computer system, and the given computer node is identified, or selected, according to the ranking, as having the least expected remaining lifetime.

Figure 8:
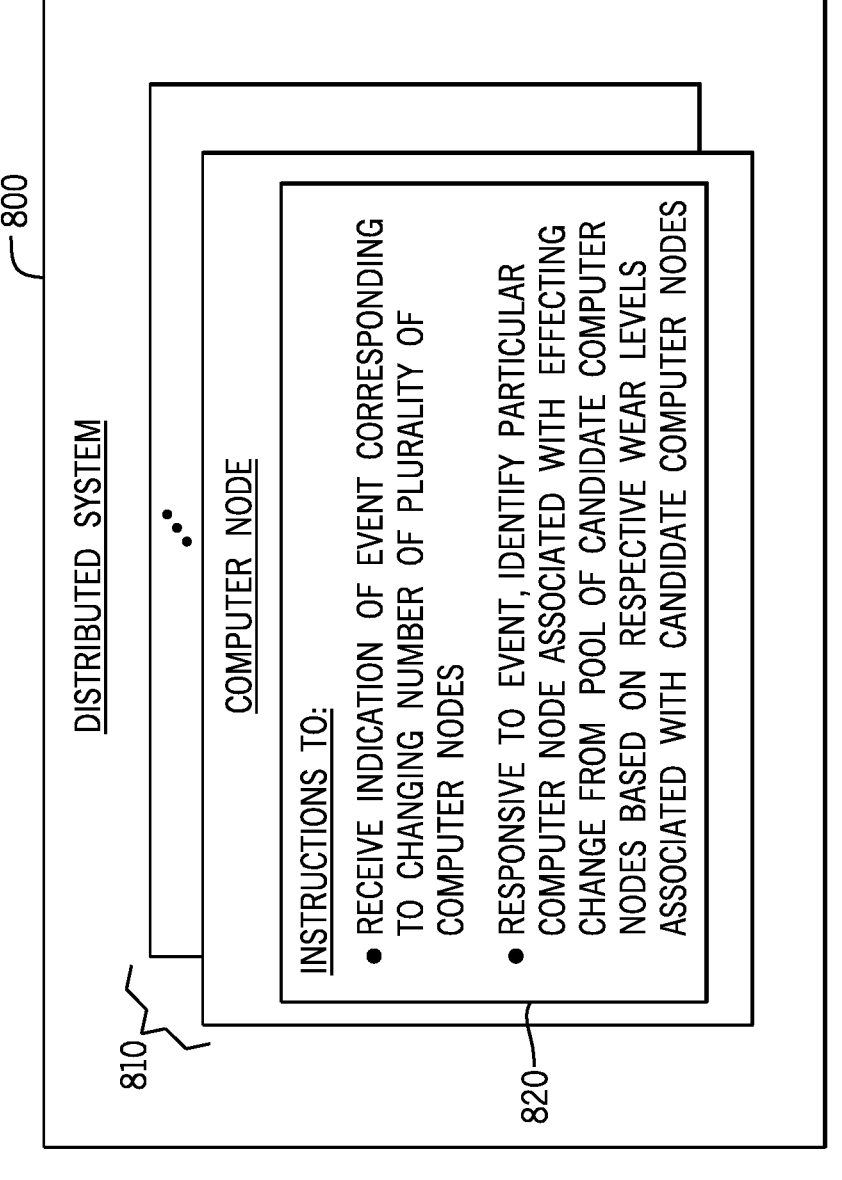
FIG. 8 is a block diagram of a distributed system having instructions to identify a computer node to effect a change corresponding to a number of the computer nodes according to an example implementation.

Referring to FIG. 8, in accordance with example implementations, a distributed system 800 includes a plurality of computer nodes 810. In accordance with example implementations, the distributed system 800 may be a software defined server, a virtualized system that includes virtual machines on respective computer nodes or a non-virtualized system. The computer nodes 810 include computer node wear-leveling instructions 820.

In accordance with example implementations, the information related to wear may be wear indicators associated with a physical processor of a computer node. As examples, the wear indicator may be a current rate of times that the processor has operated at a reduced frequency. As another example, a wear indicator may be a total number of times that the processor has operated at a reduced frequency. As another example, a wear indicator may be associated with a physical memory. For example, a wear indicator may be a pattern of error corrections applied by the computer node. Other wear indicators may be, as examples, wear indicators related to I/O devices, network devices, network cables and motherboards of the computer nodes. The instructions 820 are executable in the computer node 810 to receive an indication of an event corresponding to changing a number of the computer nodes.

The instructions 820 are executable to, responsive to the event, identify a particular computer node associated with effecting the change from a pool of candidate computer nodes based on respective wear levels that are associated with the candidate computer nodes. The identification may include identifying a particular computer node based on the ranking. Moreover, the identification may include applying an additional selection criterion (e.g., a random selection criterion a pseudo-random selection criterion or a node ID selection criterion). For example, the identification may include identifying a list of predetermined number of computer nodes based on the ranking and then randomly or pseudo-randomly selecting one or multiple computer nodes from the list.

In accordance with example implementations, the event corresponds to a downscaling of the computer system, and the given computer node is identified, or selected, according to the ranking, as having the least expected remaining lifetime.

Figure 9:
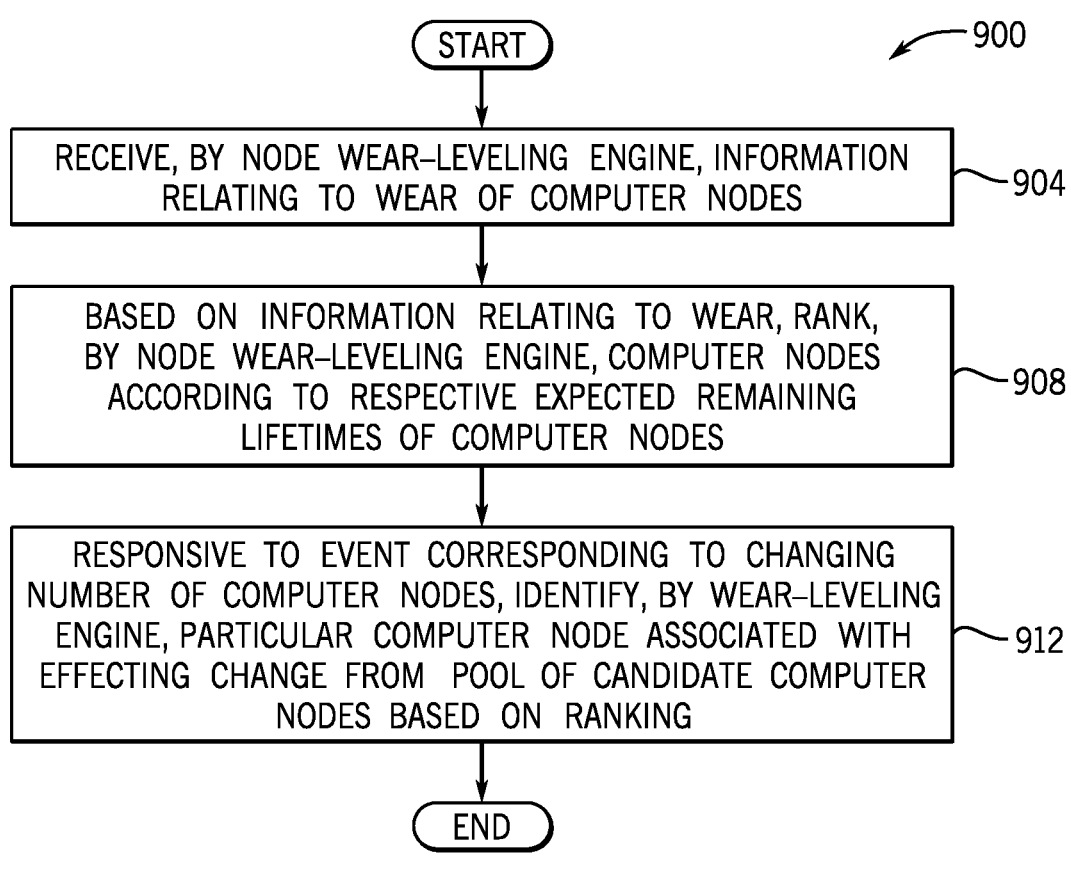
FIG. 9 is a flow diagram depicting a technique to identify a computer node to effect a change of a number of computer nodes of a distributed system based on node wear-leveling information according to an example implementation.

Referring to FIG. 9, in accordance with example implementations, a technique of a distributed system that includes a plurality of computer nodes includes receiving (block 904), by a node wear-leveling engine, information relating to wear of the computer nodes. In accordance with example implementations, the distributed system may be a software-defined server, a virtualized system that includes virtual machines on respective computer nodes or a non-virtualized system. The technique includes, based on the information relating to the wear, ranking (block 908), by the node wear-leveling engine, the computer nodes, according to respective expected remaining lifetimes of the computer nodes.

In accordance with example implementations, the information related to wear may be wear indicators associated with a physical processor of a computer node. As examples, the wear indicator may be a current rate of times that the processor has operated at a reduced frequency. As another example, a wear indicator may be a total number of times that the processor has operated at a reduced frequency. As another example, a wear indicator may be associated with a physical memory. For example, a wear indicator may be a pattern of error corrections applied by the computer node. Other wear indicators may be, as examples, wear indicators related to I/O devices, network devices, network cables and motherboards of the computer nodes.

Pursuant to block 912, the technique 900 includes, responsive to an event that corresponds to changing a number of the computer nodes, identifying, by the wear-leveling engine, a particular computer node that is associated with effecting the change from a pool of candidate computer nodes based on the ranking. In accordance with example implementations, the event corresponds to a downscaling of the computer system, and the given computer node is identified, or selected, according to the ranking, as having the least expected remaining lifetime. The identification of the computer node may include applying an additional selection criterion (e.g., random or pseudo-random selection). For example, the identification may include identifying a list of predetermined number of computer nodes (including the particular computer node) based on the ranking and then randomly or pseudo-randomly selecting one or multiple computer nodes from the list.

In accordance with example implementations, the event corresponds to a maintenance service in which the given computer node is removed from the system for maintenance. The reconfiguration includes removing the given computer node from the system. The instructions further cause the system to select the given computer node for removal from the system responsive to a determination that the respective expected remaining lifetime of the given computer node is less than at least one other respective expected remaining lifetime. Among the potential advantages, wear among the computer nodes is more uniformly distributed.

In accordance with example implementations, the instructions further cause the system to use a model to estimate the expected remaining lifetimes, and responsive to an expected remaining lifetime determined from a maintenance inspection of the given computer node after the given computer node was removed, then update the model. Among the potential advantages, the prediction accuracy of a model used to estimate remaining node lifetimes may be improved.

In accordance with example implementations, the event corresponds to a maintenance service in which the given computer node is removed from the system for maintenance, and the reconfiguration includes adding the spare computer node to the system. The instructions further cause the system to select the spare computer node responsive to a determination that a respective remaining lifetime of the spare computer node is greater than at least one other respective expected remaining lifetime of another spare computer node. Among the potential advantages, wear among the computer nodes is more uniformly distributed.

In accordance with example implementations, the system includes a distributed system, and the instructions upon execution further cause the system to assess the application workload provided by the computer nodes; determine that resources provided by the computer nodes to support the application workload are undersubscribed. The instructions upon execution further cause the system to, responsive to the determination, initiate the event to upscale the resources; and in association with the upscaling, select the spare computer node responsive to a determination that a respective remaining lifetime of the spare computer node is greater than at least one other respective remaining lifetime of another spare computer node. Among the potential advantages, wear among the computer nodes is more uniformly distributed.

In accordance with example implementations, the system include a distributed system, and the instructions further cause the system to assess an application workload that is provided by the computer nodes; determine that resources that are provided by the computer nodes to support the application workload are oversubscribed. The instructions upon execution further cause the system to, responsive to the determination, initiate the event to downscale the resources; and in association with the downscaling, select the given computer node for removal from the system responsive to a determination that the respective expected remaining lifetime of the given computer node is less than at least one other respective expected remaining lifetime. Among the potential advantages, wear among the computer nodes is more uniformly distributed.

In accordance with example implementations, the instructions upon execution further cause the system to select the given computer node, responsive to a determination that the respective expected remaining lifetime of the given computer node is the least expected remaining lifetime. Among the potential advantages, wear among the computer nodes is more uniformly distributed.

In accordance with example implementations, the information related to the wear includes information relating to at least one of errors attributable to physical memories of the computer nodes or ages of the physical memories. Among the potential advantages, wear among the computer nodes is more uniformly distributed.

In accordance with example implementations, the information relating to the wear includes information relating to at least one of temperatures of physical processors of the computer nodes, clock rates of the physical processors, or ages of the physical processors. Among the potential advantages, wear among the computer nodes is more uniformly distributed.

In accordance with example implementations, the information related to wear includes information related to at least one of errors attributable to physical network interfaces of the computer nodes or ages of the physical network interfaces. Among the potential advantages, wear among the computer nodes is more uniformly distributed.

In accordance with example implementations, the information relating to wear includes information relating to at least one of errors attributable to physical storage devices associated with the computer nodes or ages of the physical storage devices. Among the potential advantages, wear among the computer nodes is more uniformly distributed.

In accordance with example implementations, the information relating to the wear is from a program that reads data indicative of the wear from at least one of hardware registers of the computer nodes or system event logs of the computer nodes. Among the potential advantages, wear among the computer nodes is more uniformly distributed.

In accordance with example implementations, the information related to the wear is provided by a baseboard management controller. Among the potential advantages, wear among the computer nodes is more uniformly distributed.

In accordance with example implementations, the system include a distributed system that is associated with a single virtual machine, and the reconfiguration of the system is by a hyper-kernel of the computer nodes. Among the potential advantages, wear among the computer nodes is more uniformly distributed.

In accordance with example implementations, the system includes a distributed system, a hypervisor is distributed among the plurality of computer nodes, and reconfiguring the system is by the distributed hypervisor. Among the potential advantages, wear among the computer nodes is more uniformly distributed.

In accordance with example implementations identifying a particular computer node based on the ranking may include selecting a list of computer nodes based on the ranking. The list includes the particular computer node. The identification further includes randomly or pseudo-randomly selecting the particular computer node from the list. Among the potential advantages, wear among the computer nodes is more uniformly distributed.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A non-transitory machine-readable storage medium comprising instructions that upon execution cause a system of a plurality of computer nodes to:

execute a plurality of hyper-kernels on respective computer nodes of the plurality of computer nodes;

responsive to the execution of the plurality of hyper-kernels, provide a guest operating system distributed across the plurality of computer nodes;

receive information relating to wear of the computer nodes;

based on the information relating to the wear, rank the computer nodes according to respective expected remaining lifetimes of the computer nodes; and responsive to an event corresponding to at least one of a spare computer node being added to the system or a given computer node of the plurality of computer nodes being removed from the system, reconfigure the system based on the ranking.

2. The non-transitory machine-readable storage medium of claim 1, wherein:

the event corresponds to a maintenance service in which the given computer node is removed from the system for maintenance;

the reconfiguring comprises removing the given computer node from the system; and the instructions upon execution further cause the system to select the given computer node for removal from the system responsive to a determination that the respective expected remaining lifetime of the given computer node is less than at least one other respective expected remaining lifetime of the expected remaining lifetimes.

3. The non-transitory machine-readable storage medium of claim 2, wherein:

the instructions upon execution further cause the system to use a model to estimate the expected remaining lifetimes, and responsive to an expected remaining lifetime determined from a maintenance inspection of the given computer node after the given computer node was removed, then update the model.

4. The non-transitory machine-readable storage medium of claim 1, wherein:

the event corresponds to a maintenance service in which the given computer node is removed from the system for maintenance;

the reconfiguring comprises adding the spare computer node to the system; and the instructions upon execution further cause the system to select the spare computer node from among a plurality of candidate spare nodes responsive to a determination that a respective remaining lifetime of the spare computer node is greater than at least one other respective expected remaining lifetime of another spare computer node of the plurality of candidate spare computer nodes.

5. The non-transitory machine-readable storage medium of claim 1, wherein the system comprises a distributed system, and the instructions upon execution further cause the system to:

assess an application workload provided by the plurality of computer nodes;

determine that resources provided by the plurality of computer nodes to support the application workload are undersubscribed;

responsive to the determination, initiate the event to upscale the resources; and in association with the upscaling, select the spare computer node from among a plurality of candidate spare computer nodes responsive to a determination that a respective remaining lifetime of the spare computer node is greater than at least one other respective expected remaining lifetime of another spare computer node of the plurality of candidate spare computer nodes.

6. The non-transitory machine-readable storage medium of claim 1, wherein the system comprises a distributed system, and the instructions upon execution further cause the system to:

assess an application workload provided by the plurality of computer nodes;

determine that resources provided by the plurality of computer nodes to support the application workload are oversubscribed;

responsive to the determination, initiate the event to downscale the resources; and in association with the downscaling, to select the given computer node for removal from the system responsive to a determination that the respective expected remaining lifetime of the given computer node is less than at least one other respective expected remaining lifetime of the expected remaining lifetimes.

7. The non-transitory machine-readable storage medium of claim 6, wherein the instructions upon execution further cause the system to:

select the given computer node responsive to a determination that the respective expected remaining lifetime of the given computer node is the least expected remaining lifetime of the expected remaining lifetimes.

8. The non-transitory machine-readable storage medium of claim 1, wherein the information relating to the wear comprises information relating to at least one of errors attributable to physical memories of the plurality of computer nodes or ages of the physical memories.

9. The non-transitory machine-readable storage medium of claim 1, wherein the information relating to the wear comprises information relating to at least one of temperatures of physical processors of the plurality of computer nodes, clock rates of the physical processors, or ages of the physical processors.

10. The non-transitory machine-readable storage medium of claim 1, wherein the information relating to the wear comprises information relating to at least one of errors attributable physical network interfaces of the plurality of computer nodes or ages of the physical network interfaces.

11. The non-transitory machine-readable storage medium of claim 1, wherein the information relating to the wear comprises information relating to at least one of errors attributable to physical storage devices associated with the plurality of computer nodes or ages of the physical storage devices.

12. The non-transitory machine-readable storage medium of claim 1, wherein the information relating to the wear is from a program that reads data indicative of the wear from at least one of hardware registers of the plurality of computer nodes or system event logs of the plurality of computer nodes.

13. The non-transitory machine-readable storage medium of claim 1, wherein the information relating to the wear is provided by a baseboard management controller.

14. The non-transitory machine-readable storage medium of claim 1, wherein the instructions, upon execution, further cause the system to:

execute a single virtual machine across the plurality of computer nodes.

15. The non-transitory machine-readable storage medium of claim 1, wherein the system comprises a distributed system, a hypervisor is distributed among the computer nodes, and reconfiguring the system is by the distributed hypervisor.

16. A distributed system comprising:

a plurality of computer nodes;

wherein the plurality of computer nodes comprises instructions executable to:

execute a plurality of hyper-kernels on respective computer nodes of the plurality of computer nodes;

responsive to the execution of the plurality of hyper-kernels, provide a guest operating system distributed across the plurality of computer nodes;

receive an indication of an event corresponding to changing a number of the plurality of computer nodes; and responsive to the event, identify a particular computer node associated with effecting the change from a pool of candidate computer nodes based on respective wear levels associated with the candidate computer nodes.

17. The distributed system of claim 16, wherein:

the event comprises adding the particular computer node to the plurality of computer nodes;

the pool of candidate computer nodes comprises a plurality of spare computer nodes; and the computer node wear-leveling instructions are further executable to:

receive wear-leveling information relating to the plurality of spare computer nodes; and identify a spare computer node of the plurality of spare computer nodes as the particular computer node based on the wear-leveling information.

18. The distributed system of claim 16, wherein:

the event comprises removing the particular computer node from the plurality of computer nodes;

the plurality of computer nodes corresponds to the pool of candidate computer nodes; and the computer node wear-leveling instructions are further executable to:

receive wear-leveling information relating to the plurality of computer nodes; and identify, by the wear-leveling engine, a particular computer node associated with effecting the change from a pool of candidate computer nodes based on the ranking.

19. A method of a distributed system comprising a plurality of computer nodes, comprising:

executing, by the plurality of computer nodes, a plurality of hyper-kernels;

providing, by the plurality of hyper-kernels, a guest operating system distributed across the plurality of computer nodes;

receiving, by a node wear-leveling engine, information relating to wear of the computer nodes;

based on the information relating to the wear, ranking, by the node wear-leveling engine, the computer nodes according to respective expected remaining lifetimes of the computer nodes; and responsive to an event corresponding to changing a number of the computer nodes, identifying, by the node wear-leveling engine, a particular computer node associated with effecting the change from a pool of candidate computer nodes based on the ranking.

20. The method of claim 19, wherein the identifying further comprises:

selecting a list of the computer nodes based on the ranking, wherein the list includes the particular computer node; and randomly or pseudo-randomly selecting the particular computer node from the list.

\* \* \* \* \*